US012477563B2

(12) United States Patent
Deng et al.

(10) Patent No.: US 12,477,563 B2
(45) Date of Patent: Nov. 18, 2025

(54) METHODS, ARCHITECTURES, APPARATUSES AND SYSTEMS FOR SIDELINK CONTROL INFORMATION DECODING REDUCTION

(71) Applicant: InterDigital Patent Holdings, Inc., Wilmington, DE (US)

(72) Inventors: Tao Deng, Roslyn, NY (US); Moon Il Lee, Melville, NY (US); Martino Freda, Laval (CA); Tuong Hoang, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 370 days.

(21) Appl. No.: 18/019,102

(22) PCT Filed: Aug. 4, 2021

(86) PCT No.: PCT/US2021/044506
§ 371 (c)(1),
(2) Date: Feb. 1, 2023

(87) PCT Pub. No.: WO2022/031822
PCT Pub. Date: Feb. 10, 2022

(65) Prior Publication Data
US 2023/0300857 A1     Sep. 21, 2023

Related U.S. Application Data

(60) Provisional application No. 63/091,568, filed on Oct. 14, 2020, provisional application No. 63/061,359, filed on Aug. 5, 2020.

(51) Int. Cl.
*H04W 72/25* (2023.01)
*H04L 5/00* (2006.01)
*H04W 72/11* (2023.01)

(52) U.S. Cl.
CPC ........... *H04W 72/25* (2023.01); *H04L 5/0094* (2013.01); *H04W 72/11* (2023.01)

(58) Field of Classification Search
CPC ..... H04W 72/25; H04W 72/11; H04W 28/26; H04W 4/40; H04W 72/02;
(Continued)

(56) References Cited

U.S. PATENT DOCUMENTS

2019/0053267 A1   2/2019   Kim et al.
2020/0029318 A1   1/2020   Guo
(Continued)

FOREIGN PATENT DOCUMENTS

WO    WO 2020033704 A1   2/2020

OTHER PUBLICATIONS

"New WID on NR sidelink enhancement", 3GPP Tdoc RP-193231, 3GPP TSG RAN Meeting #86, Sitges, Spain, Dec. 9-12, 2019, 6 pages.

*Primary Examiner* — Rushil P. Sampat
(74) *Attorney, Agent, or Firm* — Jamie T. Nguyen

(57) ABSTRACT

Procedures, methods, architectures, apparatuses, systems, devices, and computer program products are disclosed that may be implemented in wireless transmit/receive unit (WTRU) for device-to-device communications, such as sidelink (SL) transmissions in a vehicle-to-everything (V2X) environment. In one representative method, the WTRU may monitor a resource pool for a first channel having 1st stage SL control information (SCI) and decode a detected 1st stage SCI. The 1st stage SCI may be associated with corresponding 2nd stage SCI. Based on information indicated by the decoded 1st stage SCI, the WTRU may determine whether to perform, or continue to perform, decoding of the associated 2nd stage SCI. The WTRU may also perform decoding of a second channel associated with (Continued)

the 1st stage SCI. The decoding of the 2nd stage SCI and the decoding of the second channel may be performed for a same sub-frame, slot and/or mini-slot.

20 Claims, 11 Drawing Sheets

(58) Field of Classification Search
CPC ......... H04W 72/0406; H04W 72/0446; H04W 72/0453; H04W 72/20; H04L 5/0094; H04L 5/0055; H04L 1/1861; H04L 1/0038; H04L 2001/0097
See application file for complete search history.

(56) References Cited

U.S. PATENT DOCUMENTS

| 2021/0168762 | A1* | 6/2021 | Huang | H04B 7/0456 |
| 2021/0243749 | A1* | 8/2021 | Hoang | H04W 24/08 |
| 2022/0304032 | A1* | 9/2022 | Hahn | H04W 72/20 |
| 2022/0353846 | A1* | 11/2022 | Wang | H04L 1/1861 |

* cited by examiner

800

810
DECODING A PLURALITY OF FIRST-STAGE SCI USING A SL RESOURCE POOL, THE FIRST-STAGE RCI RECEIVED IN A PLURALITY OF SLOTS OF A TRANSMISSION PERIOD, WHEREIN THE FIRST-STAGE SCI INCLUDE INFORMATION INDICATING RESOURCES TO RECEIVE ONE OR MORE SL TRANSMISSIONS IN THE SLOTS OF THE TRANSMISSION PERIOD

820
DECODING A PLURALITY OF SECOND-STAGE SCI RECEIVED IN THE PLURALITY OF SLOTS OF THE TRANSMISSION PERIOD, WHEREIN INFORMATION INDICATED BY A RESPECTIVE FIRST- AND/OR SECOND-STAGE SCI INCLUDES INFORMATION INDICATING AN ACCUMULATED NUMBER OF THE SL TRANSMISSIONS IN THE TRANSMISSION PERIOD INCLUSIVE OF A SAME SLOT IN WHICH THE RESPECTIVE FIRST- AND/OR SECOND-STAGE SCI IS RECEIVED

830
DECODING A PLURALITY OF SL TRANSMISSIONS, WHICH EACH INCLUDE A TRANSPORT BLOCK, THE SL TRANSMISSIONS OCCURRING IN THE PLURALITY OF SLOTS OF THE TRANSMISSION PERIOD

840
TRANSMITTING HYBRID AUTOMATIC REPEAT REQUEST (HARQ) FEEDBACK INFORMATION FOR THE PLURALITY OF SL TRANSMISSIONS OF THE TRANSMISSION PERIOD

FIG. 8

METHODS, ARCHITECTURES, APPARATUSES AND SYSTEMS FOR SIDELINK CONTROL INFORMATION DECODING REDUCTION

CROSS-REFERENCE TO RELATED APPLICATIONS

This application is a U.S. National Stage Application under 35 U.S.C. § 371 of International Patent Application No. PCT/US2021/044506, filed 4 Aug. 2021, which claims the benefit of U.S. Provisional Patent Application Nos. (i) 63/061,359 filed 5 Aug. 2020, and (ii) 63/091,568 filed 14 Oct. 2020; each of which is incorporated herein by reference.

BACKGROUND

The present disclosure is generally directed to the fields of communications, software and encoding, including, for example, to methods, architectures, apparatuses, systems directed to reducing the decoding of sidelink (SL) control information.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein:

FIG. 8 is a diagram illustrating another representative two-stage SCI transmission procedure with HARQ feedback for a transmission period having a plurality of slots.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
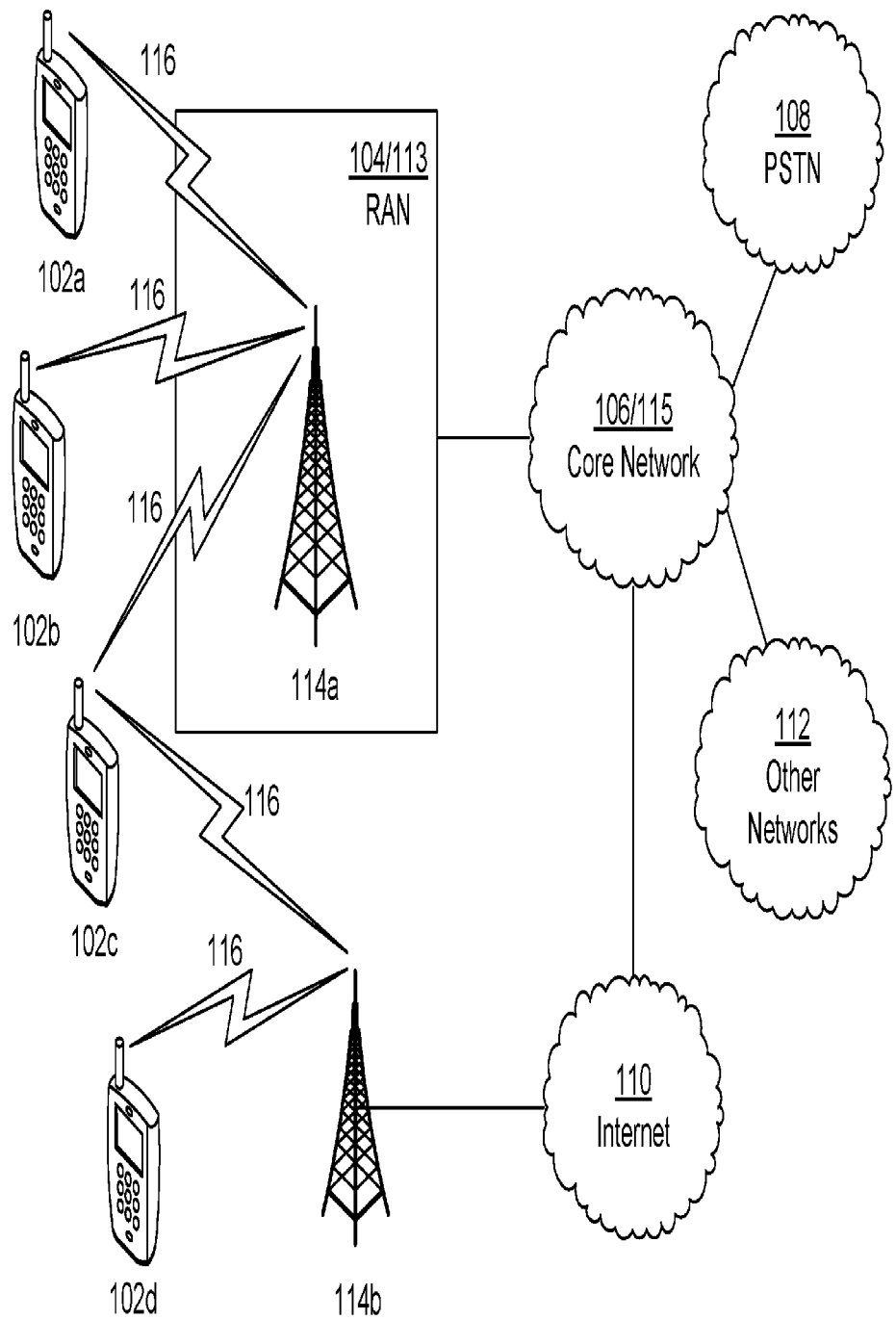
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
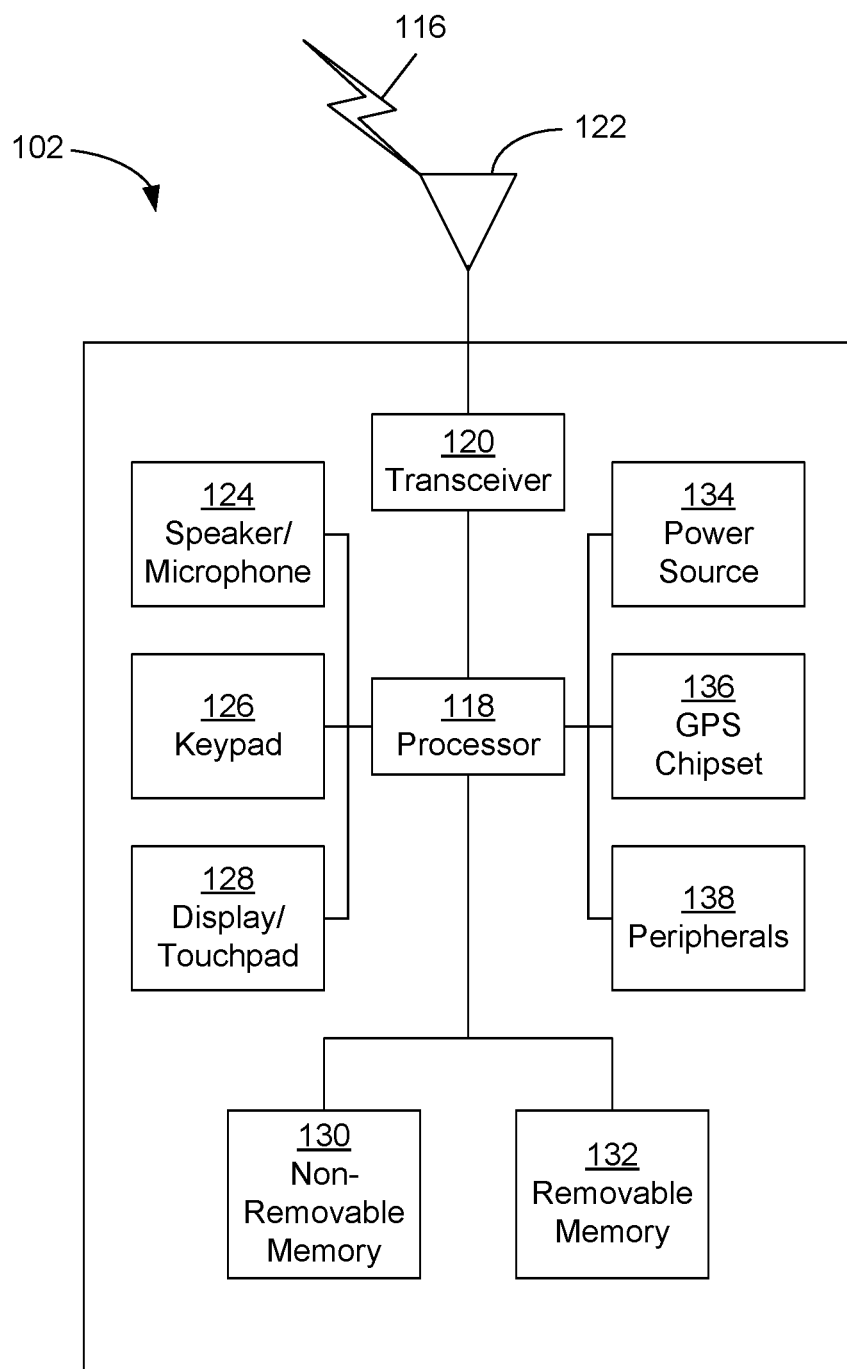
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals.

It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the aft interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
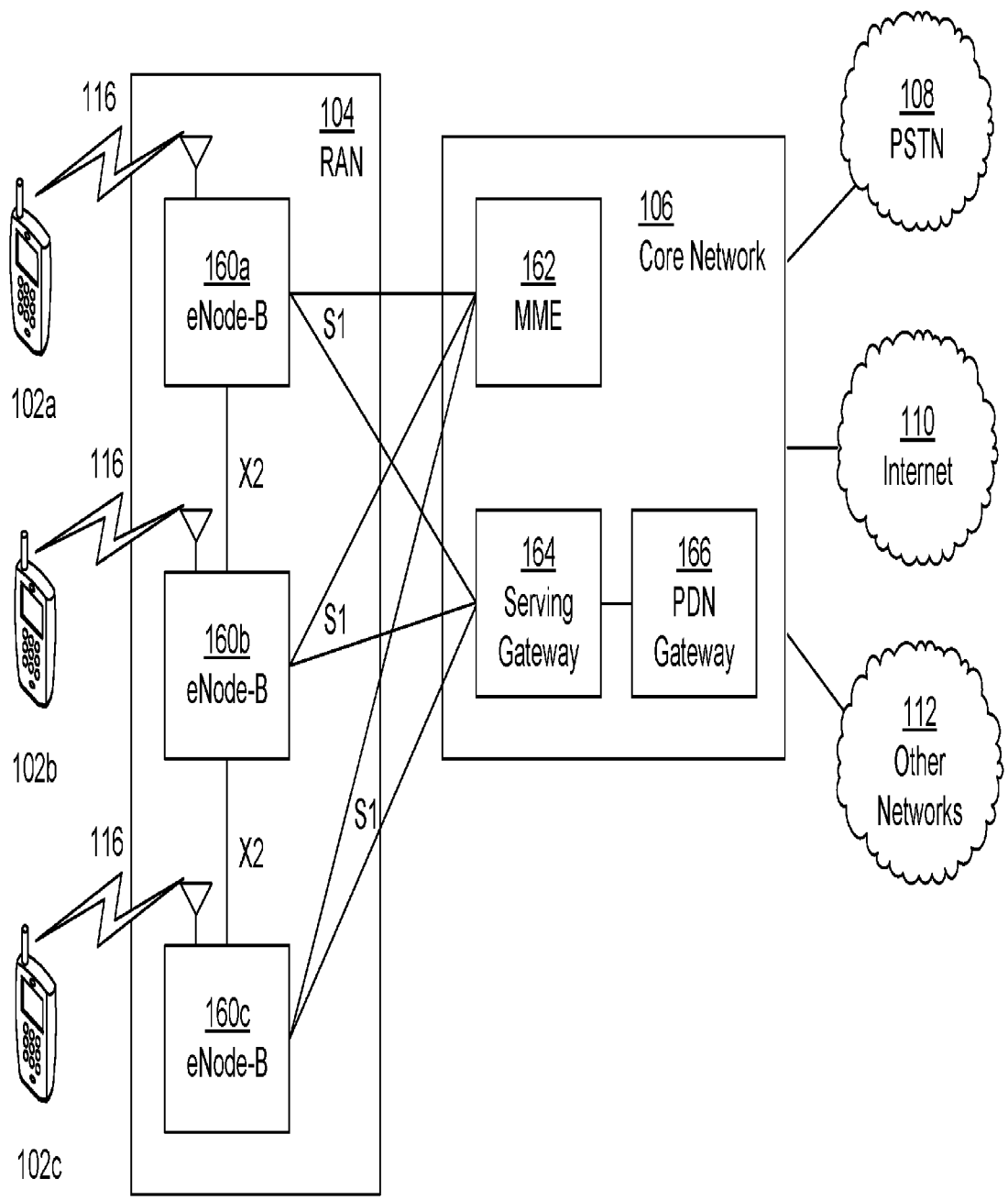
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c, The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
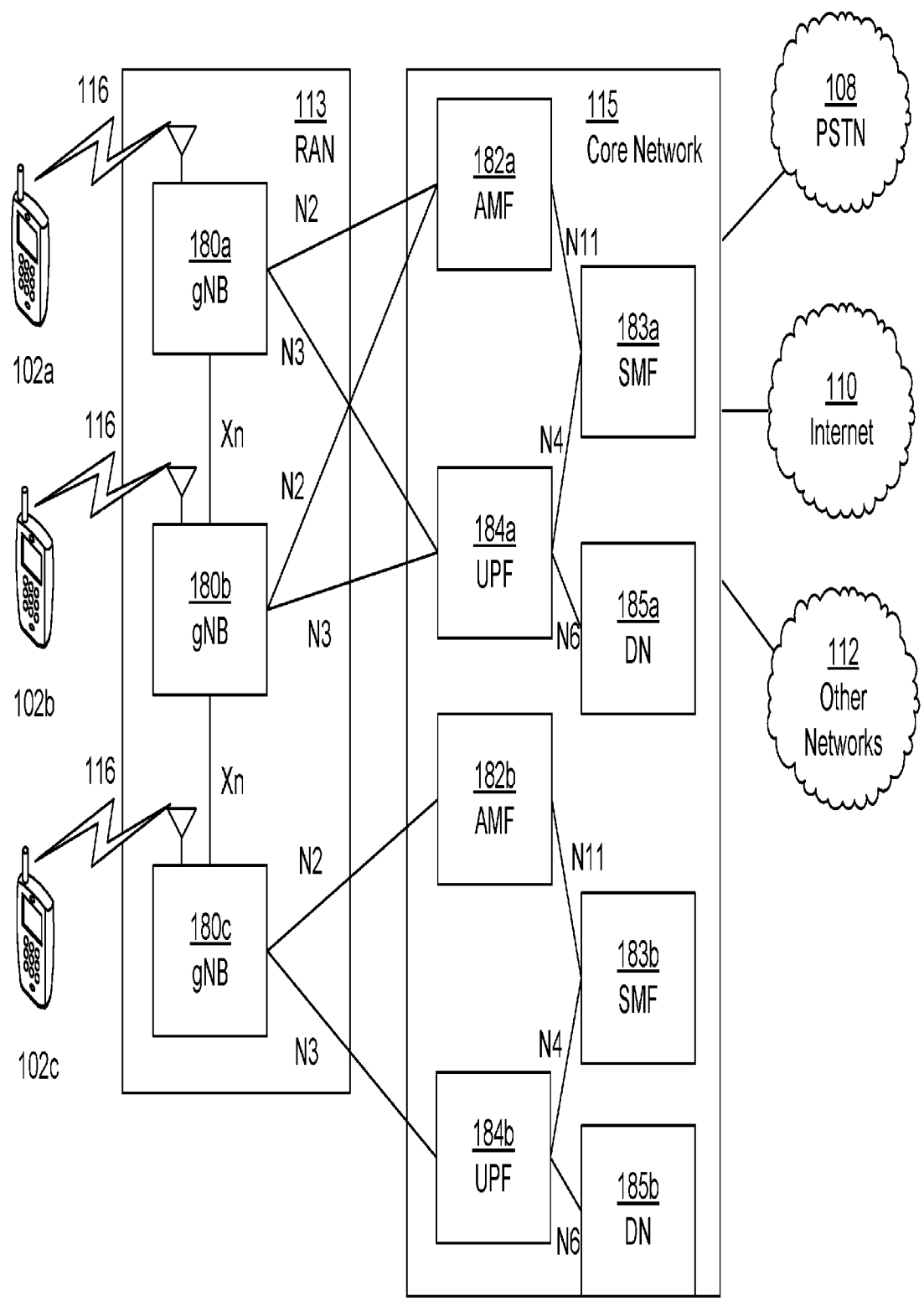
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the aft interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

In certain representative embodiments, methods, apparatus and systems may be implemented for a UE (e.g., a WTRU) to determine a Sidelink (SL) Control Information (SCI) monitoring and decoding configuration. For example, the SCI monitoring and decoding configuration may include any of (1) a resource pool, (2) a slot, (3) sub-channel, a candidate SCI format and/or (5) Resource Elements (REs). The UE may determine the SCI monitoring and decoding configuration based, at least in part, on any of (1) a UE group, (2) a SL traffic group, (3) a SL link, (4) a Quality of Service (QoS requirement), (5) a zone Identifier (ID), (6) a UE SL activity state, and/or a (6) a UE power state.

In certain representative embodiments, methods, apparatus and systems may be implemented for a UE to perform one or more SCI decoding attempts. The UE may also perform a semi-static and/or a dynamic prioritization in which the SCI decoding attempts are performed, stopped and/or continued based, at least in part, on (1) a resource reservation, (2) a Channel Busy Ratio (CBR), (3) a QoS requirement, (4) a UE group, and/or (5) a SL traffic group associated with one or more of the SCI decoding attempts.

In certain representative embodiments, methods, apparatus and systems may be implemented for a UE to perform 1st stage SCI decoding and/or corresponding 2nd stage SCI decoding. The UE may determine to proceed to a 2nd stage SCI decoding in a SCI decoding attempt based, at least in part, on 1st stage SCI indications. For example, the 1st stage SCI indications may include any of (1) a UE group, (2) a data type, (3) a service type, (4) an application type, (5) a destination type, (6) a 1-stage SCI transmission indication, (7) a UE group (e.g., groupcast) member ID, (8) a resource selection configuration, (9) an inter-UE assistance indication, (10) a UE SL activity state, (11) a UE SL power state, and/or (12) a Zone ID.

Overview

Sidelink (SL) Control Information Design

In certain representative embodiments, an SCI transmission may include two stages, a $1^{st}$ stage SCI transmission and a $2^{nd}$ stage SCI transmission. A $1^{st}$ stage SCI transmission may include a SCI format used for scheduling of transmission of an associated $2^{nd}$ stage SCI and an associated Physical SL Shared Channel (PSSCH) transmission (e.g., corresponding to the $1^{st}$ stage transmission). A resource pool may be associated with a $1^{st}$ stage SCI format (e.g., SCI format 0_1). A respective $1^{st}$ stage SCI format may be configured (e.g., pre-configured) for any resource pool. Transmission resources for a PSSCH carrying a $1^{st}$ stage SCI transmission may be configured (e.g., pre-configured) for a resource pool and may include a number of symbols (e.g., timeResourcePSCCH) starting from a second SL symbol in a slot and a number of PRBs (e.g., frequencyResourcePSCCH). By way of example, a $1^{st}$ stage transmission according to the SCI format 0_1 may include the following information: (1) a priority, (2) a frequency resource assignment, (3) a time resource assignment, (4) a resource reservation period, (5) a Demodulation Reference Signal (DMRS) pattern, (6) a $2^{nd}$ stage SCI format, (7) a beta_offset indicator, (8) a number of DMRS port(s), (9) a Modulation and Coding Scheme (MCS), and/or (10) a MCS table indication.

A size of a $1^{st}$ stage SCI format may be variable since any of the following parameters may be configured (e.g., pre-configured) per resource pool: (1) a maximum number of resources reserved for one SCI transmission (e.g., $N_{max}$), (2) a semi-persistent (SP) resource reservation (e.g., enabled or disabled), (3) a number of DMRS patterns, (4) a number of $2^{nd}$ stage SCI formats, and/or (5) a subchannel size.

A UE may decode a $2^{nd}$ stage SCI transmission using a PSSCH DMRS. The $2^{nd}$ stage SCI transmission may conform with the $2^{nd}$ stage SCI format specified by the $1^{st}$ stage SCI transmission. A $2^{nd}$ stage SCI transmission may carry the following information: (1) a Hybrid Automatic Repeat Request (HARQ) ID, (2) a New Data Indicator (NDI), (3) a Redundancy Version (RV), (4) a source ID, (5) a destination ID, (6) a CSI request, (7) a HARQ enable/disable indication, (8) a zone ID, and/or (10) a Communication Range Requirement (MCR).

In certain representative embodiments, there may be two $2^{nd}$ stage SCI formats (e.g., SCI format 2-A and/or SCI format 2-B). For example, SCI format 2-A may correspond to or be applied to groupcast transmission(s) with HARQ NACK information upon a condition that HARQ is enabled. For example, SCI format 2-B may correspond to or be applied to unicast, groupcast and/or broadcast transmissions with HARQ ACK and/or NACK information upon a condition that HARQ is enabled.

Processing-Intensive SCI Decoding Causing High UE Power Consumption

In certain representative embodiments, it may be advantageous to configure one or more UEs to perform SL operations in a power efficient manner to, for example, realize improved power management and/or savings. In certain representative embodiments, one or more UEs may be installed in, or otherwise connected to, a respective vehicle having a power supply which provides sufficient power to the UE(s) to be configured in "always-on" SL operation such that power management and/or savings may not be much of a concern.

When a destination ID and source ID are included in a $2^{nd}$ stage SCI transmission, a UE may not be able to determine whether to receive data until after decoding both the $1^{st}$ and $2^{nd}$ stage SCI formats. In such cases, performing 2-stage SCI decoding in multiple subchannels and/or slots of a resource pool may, for example, result in increased UE processing load and energy consumption.

Large NR SL Bandwidth Leading to Increased SCI Decoding

In device-to-device (D2D) communications, such as Cellular Vehicle-to-Everything (V2X) communications, a UE (e.g., V2X UE) may be configured to perform SCI decoding in any sub-channel of any configured resource pool(s), as the UE may receive data intended for itself in any given sub-channel. A number of sub-channels for SCI monitoring within a sub-frame and/or a slot and/or a mini-slot may be dependent on a processing capability of the UE. For example, in LTE V2X communications, a UE (e.g., an LTE V2X) may not be configured to perform decoding with respect to more than 10 or 20 Physical SL Control Channels (PSCCHs) in a given sub-frame according to processing capability of the UE. In LTE V2X communications, a UE may not be configured to perform decoding with respect to more than 100 or 136 RBs in a given sub-frame according to processing capability of the UE. In LTE V2X communications, a mechanism may be implemented at the UE to avoid systematic dropping of a PSCCH when the number of PSCCH candidates exceeds the UE's capability.

It should be appreciated that the increased UE processing load and energy consumption related to performing 2-stage SCI decoding may be exacerbated, for example, in consideration of the increased SL bandwidth provided for in NR SL. For example, increased SL bandwidth may lead to an increased number of sub-channels for SCI monitoring and decoding within a sub-frame and/or a slot and/or a mini-slot. In a NR V2X communication environment, a UE (e.g., a NR V2X UE) may be configured to perform SCI decoding in more sub-channels as compared to an LTE V2X UE, but the increased SCI decoding processing may nevertheless cause increased power consumption.

In certain representative embodiments, D2D communications may be performed with respect to UEs which have differing processing capabilities due to, for example, lower hardware and/or lower connectivity capabilities. With respect to V2X communications, it may be advantageous to minimize energy consumption for a UE (e.g., a Vulnerable Road User (VRU) UE, a UE associated with public safety, and/or a UE with a battery and/or power consumption constraint). For example, these types of UEs may have less hardware capability and operate with lower connectivity requirements.

Improvements to SL SCI decoding processing may reduce energy consumption due to SL SCI decoding and may, for example, lower overall power consumption when a UE is configured to perform SL communication.

Figure 2:
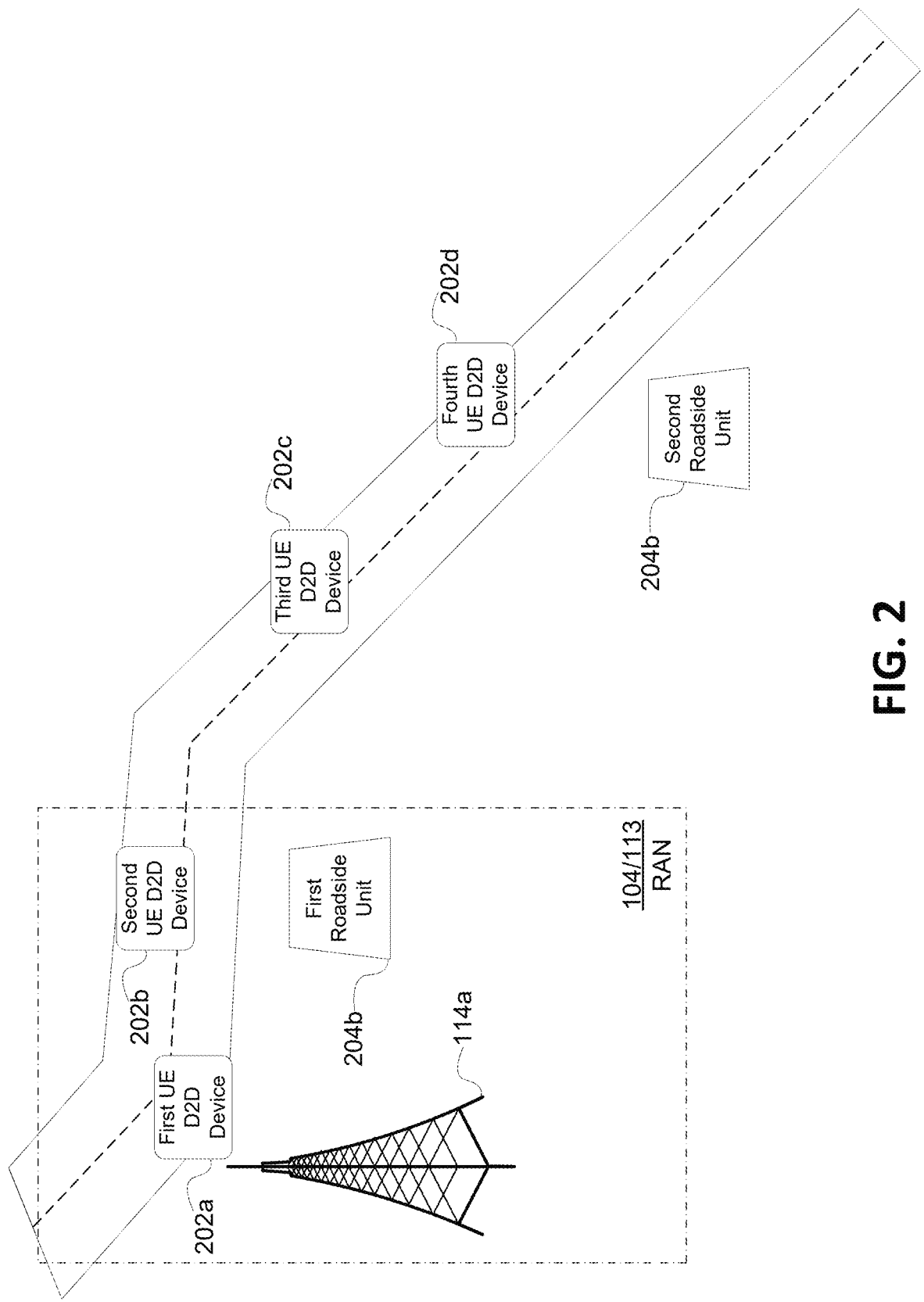
FIG. 2 is a system diagram illustrating a representative environment with a RAN and a plurality of WTRUs.

FIG. 2 is a system diagram illustrating a representative environment with a RAN and a plurality of WTRUs. As shown in FIG. 2, one or more WTRUs 102, such as, first and second UE D2D devices 202a, 202b and/or a first roadside unit 204b, may be physically located within a communication range with a RAN 104/113 and may perform transmission and reception with the RAN 104/113. One or more other WTRUs 102, such as third and fourth UE D2D devices 202c, 202d and/or a second roadside unit 204b, may be physically located outside a communication range with a RAN 104/113. The WTRUs in FIG. 2 may be configured to perform SL communications directly with other WTRUs (e.g., D2D). For example, the SL communications may be unicast, groupcast, and/or broadcast transmissions. In certain representative embodiments, the SL communications may take the form of V2X communications. However, it should be appreciated that the present disclosure is applicable to WTRUs which perform SCI decoding in D2D environments beyond V2X communications.

In a V2X environment, any of the first to fourth UE D2D devices 202a to 202d may be respectively associated with pedestrians and/or vehicles. In certain representative embodiments, a UE D2D device associated with a vehicle may be implemented as and/or incorporated with an on-board unit (OBUs) that may interconnect with other various systems such as an internal vehicle network and/or a Human Machine Interface (HMI).

UE Determination of PSSCH Monitoring Configuration

In certain representative embodiments, a PSCCH may carry a $1^{st}$ stage SCI associated with a PSSCH transmission, and a $2^{nd}$ stage SCI may be transmitted by at least one resource of the associated PSSCH. The $1^{st}$ stage SCI may include resource reservation information for the $2^{nd}$ stage SCI and associated PSSCH.

Figure 3:
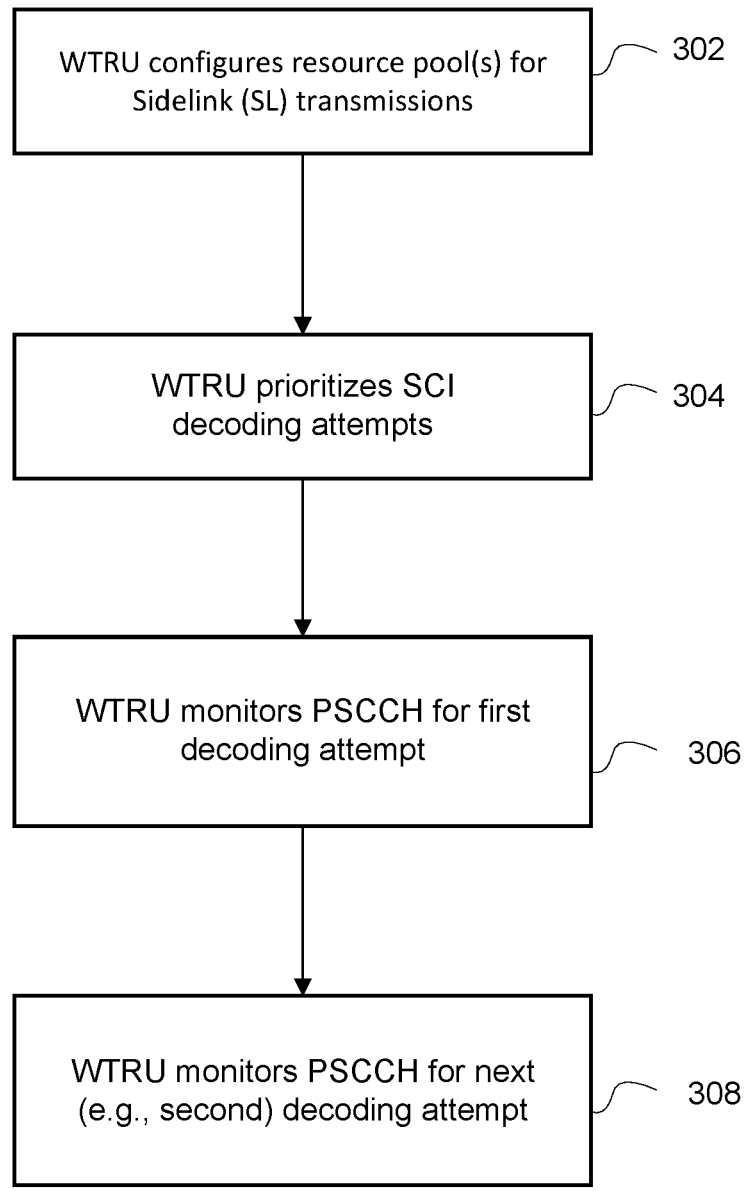
FIG. 3 is a diagram illustrating a representative procedure for prioritizing decoding attempts for D2D communications.

FIG. 3 is a diagram illustrating a representative procedure 300 for prioritizing decoding attempts for D2D communications. As shown in FIG. 3, a WTRU 102 configures one or more resource pools for sidelink (SL) transmissions (e.g., PSCCH monitoring) at 302. The UE may prioritize SCI decoding attempts at 304 as will be described later. As shown in FIG. 3, a UE may be configured to monitor for a PSCCH (or plural PSCCHs) and to detect a $1^{st}$ stage SCI on a monitored PSCCH for a first decoding attempt at 306. Upon certain conditions that will be described later, the UE may proceed, after the first decoding attempt, to monitor for a PSCCH (or plural PSCCHs) and to detect a $1^{st}$ stage SCI on a monitored PSCCH for a second decoding attempt at 308.

For example, the $1^{st}$ stage SCI may be detected according to a configured (e.g., preconfigured) $1^{st}$ stage SCI format. The $1^{st}$ stage SCI may be associated with a $2^{nd}$ stage SCI and a PSSCH. Upon a condition that the $1^{st}$ stage SCI is detected, the UE may be configured to decode the detected $1^{st}$ stage SCI. The UE may be configured to monitor a PSSCH. For example, the monitored PSSCH is associated with the decoded $1^{st}$ stage SCI. The UE may be configured to detect a $2^{nd}$ stage SCI on the associated PSSCH. Upon a condition that a $2^{nd}$ stage SCI is detected on the monitored PSSCH, the UE may be configured to decode the $2^{nd}$ stage SCI and/or the monitored PSSCH. For example, the UE may decode the $2^{nd}$ stage SCI and/or the monitored PSSCH using information included in and/or indicated by the decoded $1^{st}$ stage SCI.

In certain representative embodiments, PSCCH and associated PSSCH transmissions may be within a same time interval (e.g., subframe, slot and/or mini-slot). A PSSCH transmission may include a set of sub-channels. For example, the set of sub-channels may be contiguous (e.g., in the frequency and/or time domain). An associated PSCCH may be transmitted in a particular sub-channel of the set which may be, for example, a sub-channel of the set having a lowest index. A number of symbols and PRBs used for a PSCCH transmission in a sub-channel may be configured (e.g., preconfigured) for at least one resource pool. For example, a starting PRB of a PSCCH transmission may be the PRB having a lowest index within a sub-channel.

In certain representative embodiments, a UE may be configured to determine a SCI monitoring and decoding configuration. For example, a SCI monitoring and decoding configuration may include any of (1) a PSCCH monitoring resource pool (or a set thereof), (2) a candidate $1^{st}$ stage SCI format (or a set thereof) to monitor for any (e.g., per) PSCCH monitoring resource pool, (3) a PSCCH monitoring slot (or a set thereof) to monitor for any (e.g., per) PSCCH monitoring resource pool, (4) a PSCCH monitoring sub-channel (or a set thereof) to monitor for any (e.g., per) PSCCH monitoring resource pool, and/or (5) a PSCCH monitoring RE (or a set thereof).

PSCCH Monitoring Resource Pool

In certain representative embodiments, a UE may be configured (e.g., preconfigured) with a SL resource pool (or a set thereof) which may be associated with one or more SL Bandwidth Parts (BWPs). For example, a UE may be configured to determine a subset (e.g., one or more) of the configured (e.g., preconfigured) resource pools as a set of PSCCH monitoring resource pools. The UE may be configured monitor and decode at least one PSCCH in any determined PSCCH monitoring resource pool. For example, a UE may be configured to determine a resource pool for PSCCH monitoring upon a condition that the resource pool is indicated to be for unicast transmission, such as during a unicast link establishment. The UE may be configured to perform transmission and reception for a unicast link in the determined resource pool.

For example, a UE may be configured to determine a subset of resource pools for PSCCH monitoring upon a condition that the UE has received a data transmission, in the resource pool having a destination ID corresponding to a specified group, such as a broadcast and/or groupcast services that the UE is subscribed to (e.g., a V2X service). The UE may be configured to receive data of the subscribed service (e.g., broadcast and/or groupcast data) in the determined resource pool.

For example, a UE may be configured to determine a subset of resource pools for PSCCH monitoring upon a condition that the resource pool(s) is/are configured by any higher layer for SL communication. The higher layer may be an application layer (e.g., a V2X application layer). The UE may perform sensing in the resource pools for SCI monitoring and decoding in order to select one or more resources for SL transmission in the same resource pools which are used for SCI monitoring and decoding.

For example, a UE may be configured to determine a subset of resource pools for PSCCH monitoring upon a condition that the resource pool(s) has/have a Physical SL Feedback Channel (PSFCH) resource configuration (e.g., associated with a HARQ feedback configuration). The PSFCH resource configuration may be made by any higher layer for SL communication. The UE may determine a resource pool with configured (e.g., preconfigured) PSFCH resources as being for SCI monitoring after HARQ feedback is indicated, such as by any higher layer, for SL transmissions in the resource pool. The UE may determine a resource pool without PSFCH resources as being for SCI monitoring when HARQ feedback is not indicated.

For example, a UE may be configured to determine a subset of resource pools for PSCCH monitoring according to an activity state and/or a power state (e.g., of the UE). The UE may be configured (e.g., preconfigured) to determine the resource pool for PSCCH monitoring upon a condition that the UE is in (e.g., operating in) and/or satisfies an activity state and/or a power state which is associated with the resource pool. For example, a resource pool may be associated with any activity state and/or a power state including at least any UE states of ACTIVE, INACTIVE, SLEEP, IDLE, and/or CONNECTED.

For example, a UE may be configured to determine a subset of resource pools for PSCCH monitoring upon a condition that the resource pool(s) is/are configured (e.g., preconfigured) for a service to which the UE may subscribe. The UE may determine the resource pool for PSCCH monitoring based at least in part on the resource pool being associated with a QoS requirement of a service (e.g., a V2X service) for which the UE may subscribe and/or is subscribed to. By way of example only, a UE may determine a symbol-based resource pool for data transmission of a service having a low latency requirement as the resource pool for PSCCH monitoring.

For example, a UE may be configured to determine a subset of resource pools for PSCCH monitoring upon a condition that the resource pool(s) is/are configured (e.g., preconfigured) for a SL UE group. At least one resource pool may be associated with a SL UE group. By way of example, a resource pool(s) may be associated with a particular type and/or group of UE(s). A UE of a type (e.g., Road Side Unit (RSU)) may be configured to determine and perform SCI monitoring and decoding in a resource pool when the UE is subscribed to a service (e.g., RSU broadcast service). A resource pool may be associated with a type of UE (e.g., Vulnerable Road User (VRU)), and the UE of the type may determine to perform SCI monitoring and decoding in the resource pool when a UE group is of a type associated with the type of the UE (e.g., a VRU group).

For example, a UE may be configured to determine a subset of resource pools for PSCCH monitoring upon a condition that the resource pool(s) is/are indicated in a received transmission (e.g., a SCI transmission). For example, a UE may determine to a resource pool for PSCCH monitoring which is indicated in a received $1^{st}$ stage SCI and/or $2^{nd}$ stage SCI received transmission. The indication may be explicit, such as using a resource pool index in a SCI bit field, or implicit. The indication may be any indices of any SL BWPs and/or SL carriers and a UE may monitor for SCI in any resource pool(s) associated with any of the indicated SL BWPs and/or SL carriers.

For example, a UE may be configured to determine a subset of resource pools for PSCCH monitoring upon a condition that the resource pool(s) is/are associated with a zone (e.g., a geographic area). By way of example, a resource pool(s) may be associated with zone ID(s) and a UE may determine the resource pool(s) for PSCCH monitoring based on a respective zone ID which corresponds to a geographical location of the UE.

Candidate $1^{st}$ Stage SCI Formats

In certain representative embodiments, a UE may be configured (e.g., preconfigured) with a set of candidate $1^{st}$ stage SCI formats. A UE may determine a set of candidate $1^{st}$ stage SCI formats to monitor in any PSCCH monitoring resource pool. A candidate $1^{st}$ stage SCI format may be associated with a QoS requirement (e.g., a SL QoS requirement). For example, a candidate $1^{st}$ stage SCI format may be associated with Ultra-Reliable and Low Latency Communications-type (URLLC) SL traffic with low latency and high reliability requirements and may have a relatively compact arrangement of bit fields as compared to other candidate $1^{st}$ stage SCI formats in the set. A candidate $1^{st}$ stage SCI format may be associated with an activity state and/or a power state (e.g., of the UE). A UE may determine a subset of the $1^{st}$ stage SCI formats from the set of candidate $1^{st}$ stage SCI formats based, at least in part, on any of QoS requirements (e.g., a SL QoS requirements), activity states and/or power states (e.g. UE states).

PSCCH Monitoring Slots

In certain representative embodiments, a UE may determine a set of slots for PSCCH monitoring in any of the determined PSCCH monitoring resource pools in which any of the determined candidate $1^{st}$ stage SCI formats may be monitored. A set of PSCCH monitoring slots may include all slots belonging to any SCI monitoring resource pool. For example, a UE may be configured to determine a set of PSCCH monitoring slots based on a configured (e.g., preconfigured) SCI monitoring periodicity for any determined SCI monitoring resource pool. The SCI monitoring periodicity may be associated with an activity state and/or a power state (e.g., of the UE). The UE may be configured to determine a set of PSCCH monitoring slots in any determined PSCCH monitoring resource pool based on any of the activity state(s) and/or power state(s) which may include any of ACTIVE, INACTIVE, SLEEP, IDLE, and/or CONNECTED. Different SCI monitoring periodicities may be associated with different activity and/or power states (e.g., INACTIVE, SLEEP and/or IDLE state). For example, a UE may be configured to determine a set of PSCCH monitoring slots in any determined PSCCH monitoring resource pool based on an zone ID associated with the UE, and the zone ID may be determined based on a geographical location of the UE (e.g., GPS coordinates of the UE).

PSCCH Monitoring Sub-Channels

In certain representative embodiments, a UE may determine a set of sub-channels for PSCCH monitoring in any of the determined PSCCH monitoring resource pools in which any of the candidate $1^{st}$ stage SCI formats may be monitored. A set of PSCCH monitoring sub-channels may be contiguous and/or non-contiguous in any determined PSCCH monitoring resource pool. For example, a set of PSCCH monitoring sub-channels may include all sub-channels belonging to any PSCCH monitoring resource pool. For example, a subset of the sub-channels belonging to a determined PSCCH monitoring resource pool may be configured (e.g., preconfigured) for PSCCH monitoring. The UE may be configured to determine a set of PSCCH monitoring sub-channels in any determined PSCCH monitoring resource pool based on any of the activity state(s) and/or power state(s) which may include any of ACTIVE, INACTIVE, SLEEP, IDLE, and/or CONNECTED. Different SCI monitoring sub-channels in a PSCCH monitoring resource pool may be associated with different activity and/or power states (e.g., INACTIVE, SLEEP and/or IDLE state). For example, a UE may be configured to determine a set of PSCCH monitoring sub-channels in any determined PSCCH monitoring resource pool based on a zone ID.

PSCCH Monitoring Resource Elements

A UE may determine a set of REs for PSCCH monitoring within any determined PSCCH monitoring slot and/or sub-channel in any determined PSCCH monitoring resource pool. For example, the set of REs may be determined based on configured (e.g., preconfigured) PSCCH REs, and may include a number of PSCCH symbols within a slot and/or a number of PSCCH PRBs within a sub-channel. For example, a UE may determine a set of REs for PSCCH monitoring per PSCCH monitoring resource pool.

Prioritization of PSCCH Monitoring Configuration

In certain representative embodiments, a UE may determine a PSCCH monitoring and decoding configuration, such as determining a resource pool and any resources as discussed herein, and may prioritize PSCCH monitoring and decoding based on a UE capability. The UE capability may be a UE SCI decoding capability. The UE SCI decoding capability may be based on at least one UE hardware processing capability. By way of example only, the UE SCI decoding capability may be defined as a number of SCI decoding attempts the UE may be capable of performing within one slot (e.g., $N_{SCI\_cap}$). In another example, the UE SCI decoding capability may be defined as a number PRBs and/or sub-channels within which the UE may be capable of performing SCI decoding.

A UE may perform one or more of SCI decoding attempts within a determined PSCCH monitoring slot. A SCI decoding attempt may include processing that a UE performs in a PSCCH monitoring sub-channel. A PSSCH monitoring slot and/or a PSSCH monitoring sub-channel may belong to a PSCCH monitoring resource pool. A SCI decoding attempt may include monitoring and decoding (e.g., attempting to decode) of any of the determined set of $1^{st}$ stage SCI formats associated with a PSCCH monitoring resource pool. A SCI decoding attempt may include monitoring and decoding (e.g., attempting to decode) of each of the determined set of $1^{st}$ stage SCI formats associated with a PSCCH monitoring resource pool. A SCI decoding attempt may, for example, be associated with a QoS requirement related to a PSCCH monitoring resource pool, a candidate $1^{st}$ stage SCI format, a sub-channel and/or a slot.

Based on a determined PSCCH monitoring and decoding configuration, the number of SCI decoding attempts (e.g., $N_{SCI\_res\_pool}$) in any PSCCH monitoring resource pool may be determined as $N_{SCI\_res\_pool}$=a number of candidate $1^{st}$ stage SCI formats x a number of PSCCH monitoring sub-channels. A total number of SCI decoding attempts (e.g., $N_{SCI\_total}$) within one slot over all PSCCH monitoring resource pools may be determined as $N_{SCI\_total}=\Sigma_{i=1}^{M}(N_{SCI\_res\_pool})$ where M is a total number of the determined PSCCH resource pools.

When $N_{SCI\_total}$ is equal or smaller than $N_{SCI\_cap}$, the determined total number of PSCCH decoding attempts are within the UE processing capability, a UE may perform SCI decoding based on the determined SCI monitoring and decoding configuration. When $N_{SCI\_total}$ is larger than $N_{SCI\_cap}$, the determined total number of PSCCH decoding attempts exceeds the UE processing capability, a UE may reduce SCI decoding based on one or more configured (e.g., preconfigured) prioritization rules. For example, a UE may remove a determined PSCCH monitoring resource pool and/or a $1^{st}$ stage SCI format from the PSCCH monitoring configuration when its associated QoS requirement is below a threshold and/or the associated QoS requirement is the lowest.

In certain representative embodiments, a UE may dynamically prioritize the SCI decoding attempts in at least one determined resource pool for PSCCH monitoring based, at least in part, on any of a sub-channel for PSCCH monitoring, a resource pool PSCCH monitoring, a QoS requirement, and/or a UE group.

A UE may prioritize performing (e.g., perform first) a SCI decoding attempt (e.g., in a PSCCH monitoring sub-channel) over other SCI decoding attempts upon a condition that the PSCCH monitoring slot and/or sub-channel are reserved in a previous transmission for a blind re-transmission expected by the UE. The UE may apply a same candidate $1^{st}$ stage SCI format for the SCI decoding attempt as was used in a previous transmission, such as a blind re-transmission resource reservation. Upon a condition that a same candidate $1^{st}$ stage SCI format is applied as was used in a previous transmission, the UE may prioritize using the same candidate $1^{st}$ stage SCI format and, for example, may skip performing SCI decoding using other candidate $1^{st}$ stage SCI formats. In this manner, blind detection using all candidate $1^{st}$ stage SCI formats associated with the PSCCH monitoring resource pool may be avoided.

A UE may prioritize performing (e.g., perform first) a SCI decoding attempt (e.g., in a PSCCH monitoring sub-channel) over other SCI decoding attempts upon a condition that a PSCCH monitoring slot and/or sub-channel are reserved in a previous transmission for a HARQ re-transmission corresponding to a HARQ NACK transmission by the UE. The UE may apply a same candidate $1^{st}$ stage SCI format as was used in the previous transmission including the HARQ re-transmission resource reservation.

A UE may prioritize performing (e.g., perform first) a SCI decoding attempt in a PSCCH monitoring sub-channel upon a condition that the PSCCH monitoring sub-channel was semi-persistently reserved in a previous transmission. The PSCCH monitoring sub-channel may be prioritized with respect to a reservation interval (e.g., milliseconds (ms), slots, sub-frames, mini-slots) indicated in a prior resource reservation. The reservation interval may be a time period between a slot in which the prior resource reservation is received and a number (e.g., an integer 'X') of slots (ms, sub-frames and/or mini-slots) indicated in the prior resource reservation.

A UE may prioritize performing (e.g., perform first) a SCI decoding attempt in any determined resource pool for PSCCH monitoring over other SCI decoding attempts upon a condition that the resource pool was indicated in a previous transmission by another UE. For example, the indication may be any of a SL resource pool indication bit field, SL BWP bit field, and/or a SL carrier indication bit field in a received SCI. A UE may apply the indicated resource pool for prioritizing any SCI decoding attempts for any (e.g., all) SL links with the UE which sent the indication.

A UE may prioritize performing (e.g., perform first) a SCI decoding attempt in any determined resource pool for PSCCH monitoring upon a condition that a Channel Busy Ratio (CBR) is below a threshold. CBR may be measured at the UE. For example, a UE may prioritize performing the SCI decoding attempts in the determined PSCCH monitoring resource pools in an order (e.g., ascending) according to the measured CBRs. As a lower CBR measurement may imply lower interference in a resource pool, prioritization of SCI decoding attempts in a resource pool with less interference may improve the SCI decoding performance.

A UE may prioritize performing (e.g., perform first) SCI decoding attempts in any determined resource pool for PSCCH monitoring in an order (e.g., ascending) according to at least one QoS requirement (e.g., a latency requirement). For example, a UE may prioritize SCI decoding attempts associated with data transmissions with lower latency requirements.

A UE may prioritize performing (e.g., perform first) SCI decoding attempts in any determined resource pool for PSCCH monitoring in an order (e.g., ascending) according to a QoS requirement (e.g., a reliability requirement) of data transmission (e.g., Block Error Rate (BLER) of data). For example, a UE may prioritize SCI decoding attempts associated with data transmissions with lower BLERs.

A UE may prioritize performing (e.g., perform first) SCI decoding attempts in any determined resource pool for PSCCH monitoring in a descending order according to a priority requirement of data transmission. For example, a UE may prioritize SCI decoding attempts associated with data transmissions with higher priority. In other words, data transmission priority (e.g., SL transmission priority) may indicate SCI decoding priority.

A UE may prioritize performing (e.g., perform first) SCI decoding attempts order according to a UE group, such as a V2X group. For example, a UE may prioritize to decode SCI transmissions from any of an emergency V2X UE (fire truck), a critical mission V2X UE (police radio), a Vulnerable Road User (VRU) and a RSU (Road Side Unit). In other words, a UE may perform SCI decoding attempts in a configured (e.g., preconfigured) order according to a UE data group(s) (e.g., V2X data groups). For example, a UE may prioritize SCI decoding of a transmission for an emergency maneuver message. A UE data group may be indicated in a prior resource reservation, such as in an initial transmission of a TB and/or a previous semi-persistent transmission.

A UE may dynamically determine which of the SCI decoding attempts to prioritize as discussed above within a PSCCH monitoring slot, such as, for example, when a number of semi-statically determined total SCI decoding attempts exceeds the UE processing capability. When a number of performed prioritized SCI decoding attempts reaches a threshold associated with the UE processing capability, a UE may drop any remaining SCI decoding attempts within a respective PSCCH monitoring slot.

SCI Decoding Attempt Continuation

In certain representative embodiments, a respective SCI decoding attempt is performed as a multi-stage SCI decoding process. In certain representative embodiments, a 2-stage SCI decoding process is performed for each SCI decoding attempt. For example, a 2-stage SCI decoding process may include performing decoding of a $1^{st}$ stage SCI information and further decoding a $2^{nd}$ stage SCI information.

Figure 4:
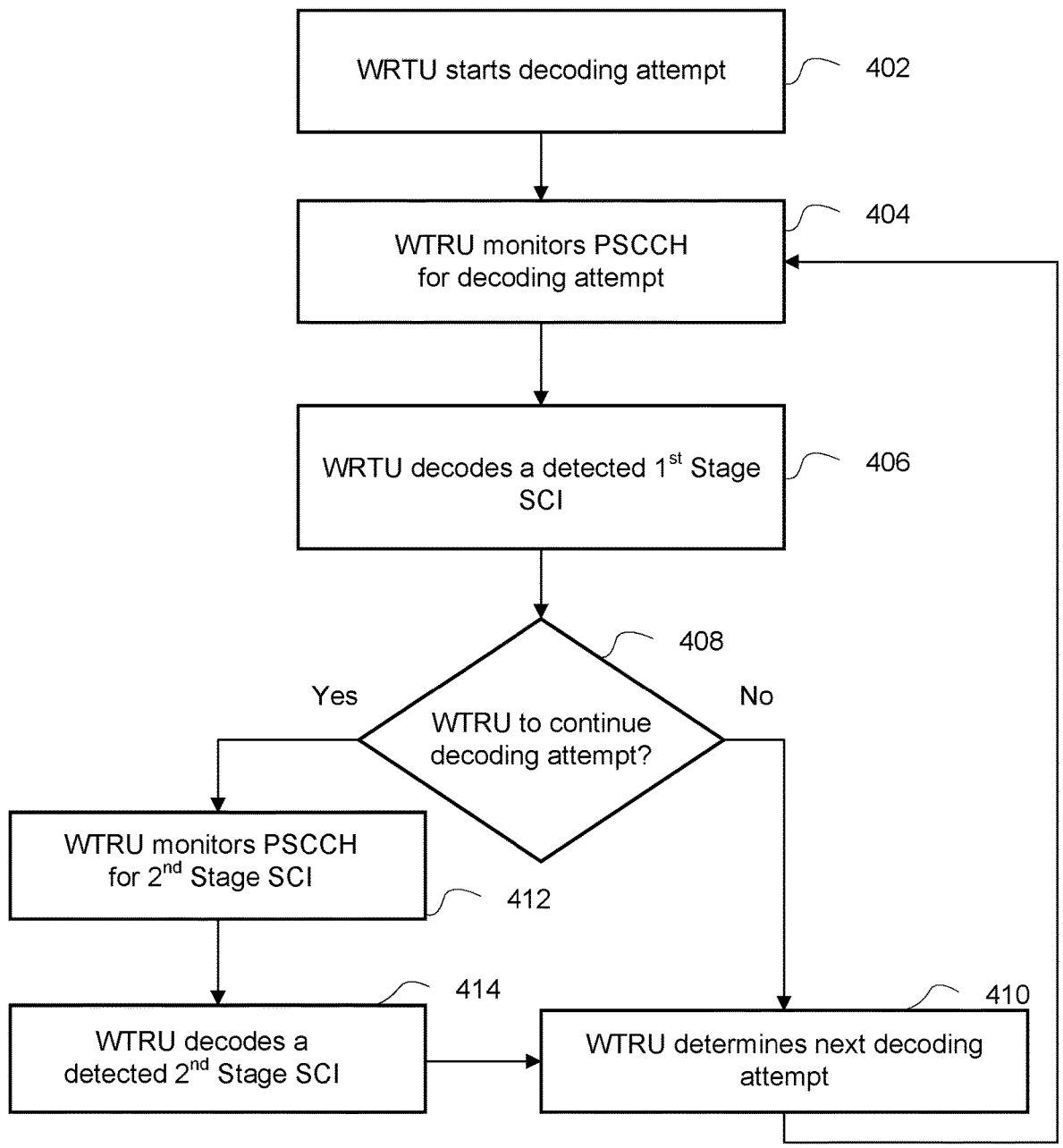
FIG. 4 is a diagram illustrating a representative procedure for performing a decoding attempt.

FIG. 4 is a diagram illustrating a representative procedure 400 for performing a decoding attempt. As shown in FIG. 4, a UE may start a respective SCI decoding attempt at 402, such as the first decoding attempt in FIG. 3. The UE may monitor at 404 one or more PSCCHs in order to detect and decode a $1^{st}$ stage SCI format corresponding to the respective SCI decoding attempt at 406. Upon decoding the $1^{st}$ stage SCI information, the UE may obtain information for decoding a $2^{nd}$ stage SCI format (e.g., information necessary to decode a $2^{nd}$ stage SCI transmission without blind detection). To optimize and/or reduce power consumption, a UE may determine whether or not to continue the respective SCI decoding attempt at 408. For example, the UE may perform an early termination of the SCI decoding attempt at 410 upon a condition that the UE recognizes that a data transmission (e.g., a transmission associated with the SCI decoding attempt) is not applicable to the UE after a successful $1^{st}$ stage SCI decoding. A UE may determine not to decode a $2^{nd}$ stage SCI decoding and thereby terminate the SCI decoding attempt based at least in part on any of the following information in the decoded $1^{st}$ stage SCI transmission: (1) SL UE group; (2) a V2X data, service, application, destination ID; (3) a $1^{st}$-stage SCI transmission indication; (4) a UE groupcast member ID; (5) SL link ID; (6) a re-transmission indication; (7) a SL resource pool/SL BWP and/or SL carrier; (8) a resource selection configuration; (9) an inter-UE assistance indication; (10) a UE SL activity and/or power state indication; (11) a configuration including L1 priority, MCS table, $2^{nd}$ stage SCI format and/or DMRS configuration/ports; (12) a subchannel location and/or index in which a $1^{st}$ stage SCI is received; and/or (13) Reference Signal Received Power (RSRP) of PSCCH DM-RS where a $1^{st}$ stage SCI is received. After determining to terminate the SCI decoding attempt, the UE may proceed to start a next SCI decoding attempt, such as the second decoding attempt in FIG. 3, by repeating the procedure shown in FIG. 4.

In certain representative embodiments, a UE may receive a $1^{st}$ stage SCI transmission in a PSCCH. For example, upon a condition that a RSRP (e.g., L1-RSRP) of the PSCCH is lower than a threshold, the UE may determine not continue to the respective decoding attempt. The UE may terminate any monitoring and/or decoding of a $2^{nd}$ stage SCI transmission associated with the respective decoding attempt. After stopping the respective decoding attempt, the UE may proceed to perform a next SCI decoding attempt. For example, the next SCI decoding attempt may be determined according to the prioritizations described above.

In certain representative embodiments, a UE may determine not to decode a $2^{nd}$ stage SCI format and not to continue (e.g., terminate) a SCI decoding attempt when the UE recognizes that the associated data transmission is a 1-stage transmission. For example, the $1^{st}$ stage SCI format may include a 1-stage transmission indication. The UE may continue to decode the associated PSSCH using the decoded 1-stage SCI information. A UE may determine to discontinue and/or not decode the $2^{nd}$ stage SCI format and terminate the SCI decoding attempt prior to completing the decoding of the $2^{nd}$ stage SCI format, and may continue to decode the associated PSSCH based on an indication of 1-stage SCI transmission. The indication of 1-stage SCI transmission may be implicit or explicit.

As shown in FIG. 4, the UE may determine to continue with the respective decoding attempt by monitoring (e.g., the PSCCH(s)) for a $2^{nd}$ stage SCI information associated with the respective SCI decoding attempt at 412. For example, the decoded 1-stage SCI information may indicate a format of the $2^{nd}$ stage SCI information. Upon detection of the $2^{nd}$ stage SCI information, the UE may decode the detected $2^{nd}$ stage SCI information at 414. Assuming the $2^{nd}$ stage SCI information is successfully decoded, the UE may proceed to start the next decoding attempt at 410 as in FIG. 4. In certain embodiments, the next (e.g., subsequent) decoding attempt may be determined according to the prioritization(s) described herein. In certain embodiments, the next decoding attempt may occur in a same time interval (e.g., subframe, slot and/or mini-slot) as the previous decoding attempt.

Continuing a SCI Decoding Attempt Based on SL UE Group in a $1^{st}$ Stage SCI Transmission In certain representative embodiments, a UE may perform one or more SL operations for an SL UE group to which the UE may belong. The SL operations may be predefined or otherwise configured from the SL UE group. For example, the SL UE groups may include any of: (1) a Vehicle UE (VUE) group, which may be one or more vehicle equipped with V2X capability; (2) a pedestrian UE (PUE) group which may be one or more hand-held UE devices equipped with V2X capability and/or carried by a non-motorized road user, e.g. a pedestrian or cyclist; (3) an emergency VUE and/or PUE (EVUE/EPUE) group which may be one or more emergency vehicles equipped with V2X capability and/or carrying out emergency tasks (e.g., a fire truck or an ambulance) and/or one or more one or more hand-held UE devices carried by pedestrian(s) and/or performing critical mission tasks (e.g., policeman in rescue missions); (4) a Road Side Unit (RSU) group which may be one or more fixed infrastructure nodes equipped with V2X capability and/or providing localized V2X service to assist traffic and road operations (e.g. an intersection traffic signal controller); (5) a Vulnerable Road User (VRU) group which may be one or more PUEs that may support additional and/or partial V2X data and service. For example, a VRU device may be attached to a backpack of a child or a safety vest of a worker at road work site. A partial V2X capability may be associated with a hardware (HW) capability of the VRU device (e.g. a device equipped with a transmitter or a receiver only). A transmitter (TX) VRU device may only transmit SL data (e.g. perform V2X broadcast transmission). A receiver (RX) VRU device may only receive SL data (e.g. receive V2X broadcast transmission). A transceiver (TRX) VRU device may have full V2X capability in terms of both transmitting and receiving SL data.

A SL UE group (e.g. VUE, PUE and VRU) may be associated with a defined (e.g., predefined) UE attribute (e.g., V2X UE attribute) and the UE attribute may be reported to the network. The UE attribute may be a type of road user (e.g., motorized/non-motorized) and/or a HW capability (e.g., TX-only, RX-only, or TRX). In certain representative embodiments, a UE may dynamically update the SL UE group to which it belongs. For example, the SL UE group may be based at least in part on any of (1) traffic and/or road conditions; (2) UE location; (3) UE activity; and/or (4) a UE activity and/or power state.

A UE may update its UE group, such as between PUE and VRU, based on real-time traffic and/or road conditions in which the UE finds itself. For example, when a PUE enters a vulnerable situation with a potential hazard, such as walking on a road shared with VUE(s) and/or crossing an intersection, the PUE may update its UE group to VRU. The UE may determine an entrance into an intersection based on received traffic information from one or more RSUs in the vicinity of the intersection and/or location information. Geolocation and/or map data received from an RSU may enable a UE to determine the location within a street crossing. In another example, a PUE may updates its UE group to VRU when the PUE performs activities vulnerable to traffic hazards (e.g. when the PUE is occupied with gaming activities) based on application layer messaging. In another example, the UE may determine to update its group to VRU when a UE velocity exceeds a configured (e.g., pre-configured) threshold associated with the location (e.g. exceeding a speed limit), In certain representative embodiments, a UE may adjust one or more SL operations in accordance with its SL UE group. For example, when a UE enters a busy intersection and updates its SL UE group from PUE to VRU, the UE may subscribe to a service, such as a localized V2X service (e.g., intersection traffic signaling broadcast from RSUs around the intersection), and adjust accordingly the SCI monitoring and decoding configuration.

A SL UE group indication may be defined in at least one $1^{st}$ stage SCI format. Code points may be configured (e.g., pre-configured) per SL resource pool based on which ones of the SL UE groups are supported by the respective resource pool(s). For example, a 2-bit SCI indication field may be used and code points of 00, 01, 10 and 11 may correspond with the UE groups of VUE, PUE, RSU and VRU, respectively, for a resource pool shared by all these UE groups. In another example, a 3-bit SCI indication field may be used to add code points for additional SL UE groups such as EVUE, EPUE and/or RX VRU.

A SL UE group bit field may indicate which SL UE group that data carried in an associated PSSCH may be intended for. A UE may proceed with monitoring and/or decoding a $2^{nd}$ stage SCI and/or associated PSSCH when its own SL UE group is indicated in the $1^{st}$ SCI format. A UE may determine not to proceed and/or continue to decode a $2^{nd}$ stage SCI format and to terminate the SCI decoding attempt when its SL UE group is not indicated in the decoded $1^{st}$ stage SCI. For example, in a respective SCI decoding attempt by a PUE, when the decoded SL UE group indication in the $1^{st}$ stage SCI is VUE or VRU (e.g., the data associated with the $1^{st}$ stage SCI is intended for a VUE or a VRU device), the PUE may discontinue the SCI decoding attempt and/or proceed to a next SCI decoding attempt (e.g., attempt in a next PSCCH monitoring sub-channel and/or a next candidate $1^{st}$ stage SCI format). In another example, when the SL UE group indicated in a $1^{st}$ stage SCI is EVUE and/or EPUE, the associated data may be intended for emergency V2X UEs and any UEs not belonging to the EVUE and/or EPUE group may discontinue (e.g., terminate early) the respective SCI decoding attempt.

Continuing a SCI Decoding Attempt Based on V2X Data Group in a $1^{st}$ Stage SCI Transmission In certain representative embodiments, a UE may perform one or more SL operations for one or more V2X data groups to which the UE may subscribe. The SL operations may be predefined or otherwise configured from any of the V2X data groups. For example, a V2X data group may be associated with, directly determined by and/or represented by one or more of any of V2X services, V2X applications, V2X traffic types, L2 destination IDs and/or L1 destination IDs. UE determination of continuing and/or discontinuing a respective SCI decoding attempt based on a UE V2X data group may apply for any (e.g., all) UE groups based on V2X service, V2X application, V2X traffic type, L2 destination IDs and/or L1 destination IDs.

In certain representative embodiments, UE grouping may be based on the V2X data groups to which any UE may subscribe. UE grouping may be based on destination IDs (e.g., a set of L2/L1 destination IDs may be associated with a V2X service that a UE may subscribed to and all UEs configured (e.g., pre-configured) with one or more of the L2/L1 destination IDs in the set may belong to the same SL UE group). UE determination whether to continue a SCI decoding attempt or not based on at least one UE V2X data group may also apply for UE groups associated with V2X data types, V2X services, V2X applications, V2X traffic types, L2 destination IDs and/or L1 destination IDs.

For example, UE V2X data groups may be based on V2X data/service/application/UE ID and may grouped according to any of: (1) Cooperative Awareness/Maneuver Message (CAM); Pedestrian Safety Message (PSM); Decentralized Environmental Notification Message (DENM); Signal Phase and Time (SPaT) message; Map Data (MAP) message; and/or discovery message. CAM data may include basic vehicle safety information (e.g. traveling path, lane changing warning, collision warning, emergency vehicle alert, etc.). PSM data may pertain to pedestrian safety (e.g. intersection movement assistance, traffic signal information, emergency vehicle approaching, etc.). For example, a Collision Risk Alert may be sent from a VRU to another VRU and may be intended for the other VRU. DENM data may include an environmental notice relevant to a current location and/or path of the VRU (e.g. school zone warning, road work, weather warning, etc.). SPaT data may provide information on traffic signals relevant to a current location and/or path of the VRU (e.g., a current status of a traffic signal ahead and a timing of the next signal stage change along the current path). MAP data may describe a physical geometry of intersections and other road features. MAP data may be provided together with SPaT data by a UE (e.g., an RSU for intersection safety V2X applications). A discovery message may be intended for direct UE discovery in SL relay applications.

A UE may support a set of V2X data groups based on at least one supported V2X service configured by one or more higher layers, which may be UE layers or network layers (e.g., V2X layers). A UE may update the supported V2X data group(s) based on any of UE group, UE event, UE location, UE current path, traffic and/or road conditions, UE activity/power state, and/or speed. For example, an event, such as a VUE entering an intersection, may trigger a reception of SPaT and/or MAP message provided by one or more local RSUs around the intersection in addition to PSM data. In another example, an event, such as a UE exiting a highway and entering a local residential area, may trigger a reception of DENM data in addition to CAM data. Events may be determined by a UE and may be based on, for example, UE location, current path, map data and/or traffic information received from RSU. A UE may be triggered to receive additional CAM data when UE speed exceeds a configured (e.g., pre-configured) threshold (e.g. speed limit in an area).

A UE group may be associated with a set of V2X data groups and the UE may update the subscribed V2X data groups based on a current UE group. For example, when a UE updates its UE group from PUE to VRU, the may also add any (e.g., all) V2X data groups specific to VRU UEs to its subscription.

A V2X data group indication may be defined in any $1^{st}$ stage SCI format. Code points may be configured (e.g., pre-configured) per SL resource pool based on which ones of the V2X data groups and/or V2X services is supported by the respective resource pool(s). For example, a 2-bit SCI indication field may be used, and each code point may correspond to a V2X data group or a set of V2X data groups. For example, the code points of 00, 01, 10 and 11 may be used to indicate CAM, PSM, DENM and SPAT and/or MAP. In another example, a 3-bit SCI indication field may be used to include code points for additional V2X data groups (e.g., an additional code point for discovery message).

The V2X data group indication (e.g., bit field) may be included in a (e.g., candidate) $1^{st}$ stage SCI format to indicate what V2X data may be carried in the associated PSSCH. A UE may proceed with decoding an associated $2^{nd}$ stage SCI and/or associated PSSCH upon the condition that the UE has subscribed to the V2X data group indicated in the received $1^{st}$ SCI format. The UE may determine not to monitor for and/or decode a $2^{nd}$ stage SCI format and to discontinue the respective SCI decoding attempt when any V2X data groups the UE may have (or is) subscribed to are not indicated in the decoded $1^{st}$ stage SCI. For example, in a SCI decoding attempt by a UE, when a decoded V2X data group indication in the $1^{st}$ stage SCI indicates a discovery message and the UE has not (or is not) subscribed to any V2X application associated with a discovery message, the UE may discontinue (e.g., terminate early) the SCI decoding attempt and may proceed to a next SCI decoding attempt (e.g., in the next PSCCH monitoring sub-channel and/or a next candidate $1^{st}$ stage SCI format).

Continuing a SCI Decoding Attempt Based on UE Groupcast Member Identity in a $1^{st}$ Stage SCI Transmission In certain representative embodiments, a UE may be configured (e.g., pre-configured) by one or more higher layers with a groupcast member ID (e.g., a group member index). A bit field indication may be included in a (e.g., candidate) $1^{st}$ stage SCI format to indicate a groupcast member ID. A number of bits of the SCI field may depend on a maximum supported size of a group configured (e.g., pre-configured) by the one or more higher layers. For example, a 6-bit groupcast member ID indication SCI field may be used when the configured (e.g., pre-configured) maximum size of a group is 64. This may facilitate transmission between two members of a same V2X group without establishing a unicast link between the two members. In addition, the groupcast member ID indication may be used by a TX UE to determine a HARQ feedback transmission resource (e.g., a PSFCH frequency resource).

For example, a UE may proceed with decoding an associated $2^{nd}$ stage SCI and/or associated PSSCH when its own groupcast member ID is indicated in a received $1^{st}$ SCI format. The UE may determine not to monitor and/or decode the $2^{nd}$ stage SCI format and to discontinue the respective SCI decoding attempt when its groupcast member ID is not indicated in the decoded $1^{st}$ stage SCI. As explained elsewhere, the UE may also proceed to a next SCI decoding attempt.

Continuing a SCI Decoding Attempt Based on SL Link Identity in a $1^{st}$ Stage SCI Transmission In certain representative embodiments, a UE may be configured (e.g., pre-configured) by one or more higher layers with a SL link ID. For example, a UE may operate a set of unicast link(s) and any of the unicast links may be configured (e.g., pre-configured) with a SL link ID. The SL link ID may be a unicast link index. For each unicast link, both UEs may identify a data transmission specific to the unicast link based on the unicast link index. For example, a unicast SL link index may be specific to a pair of a source ID and a destination ID that may identify a respective unicast SL link.

A UE may associate a set of transmission and/or reception configuration(s) with each configured (e.g., pre-configured) SL link ID. For example, a (e.g., link-specific) transmission parameters may include any of a maximum power, a power control offset, a MCS range, a path loss compensation factor, etc. In another example, a reception configuration may be associated with a link and may include a PSCCH monitoring configuration discussed which may be determined as described elsewhere herein. There may be one or more SL links between two UEs, any of which may apply or otherwise be associated with a specific transmission and/or reception configuration to operate on a same physical radio link.

In certain representative embodiments, bit field indication may be included in a (e.g., candidate) $1^{st}$ stage SCI format to indicate the SL ID (e.g. a unicast link index). A number of bits of the SCI ID bit field indication may depend on a maximum supported number of unicast links and may be configured (e.g., pre-configured) by one or more higher layers. For example, a 3-bit SL ID indication SCI field may be used when the configured (e.g., pre-configured) maximum supported number of unicast links is 8.

A UE may proceed with decoding an associated $2^{nd}$ stage SCI and/or associated PSSCH when one of its active SL links is indicated in a received $1^{st}$ SCI format (e.g., transmission). A UE may determine not to monitor and/or decode a $2^{nd}$ stage SCI format (e.g., transmission) and to discontinue (e.g., terminate early) the respective SCI decoding attempt when none of the active SL links of the UE are indicated in the decoded 1$^{st}$ stage SCI. As explained elsewhere, the UE may also proceed to a next SCI decoding attempt.

Continuing a SCI Decoding Attempt Based on a Re-Transmission Indication in a 1$^{st}$ Stage SCI Transmission In certain representative embodiments, a 1-bit field indication may be included in a (e.g., candidate) 1$^{st}$ stage SCI format to indicate whether or not an associated PSSCH may be a re-transmission. For example, the bit may be zero when the associated PSSCH carries an initial transmission, such as for a new TB. The bit may be one when the associated PSSCH carries a blind re-transmission or a HARQ-based re-transmission.

When a re-transmission is indicated in a received 1$^{st}$ stage SCI, a UE may proceed with decoding the associated 2$^{nd}$ stage SCI and/or associated PSSCH upon a condition that there is stored data in a HARQ data buffer for combining with an upcoming blind or HARQ-based re-transmission. A UE may determine not to monitor for and/or decode a 2$^{nd}$ stage SCI format and to discontinue the respective SCI decoding attempt upon a condition that a re-transmission is indicated in the received 1$^{st}$ stage SCI and no data (e.g., for combining) is stored in any of HARQ data buffer. As explained elsewhere, the UE may also proceed to a next SCI decoding attempt.

Continuing a SCI Decoding Attempt Based on a SL Resource Pool, SL BWP and/or SL Carrier Indication in a 1$^{st}$ Stage SCI Transmission In certain representative embodiments, a UE may determine a set of PSCCH monitoring resource pool(s) as discussed herein from amongst the configured (e.g., pre-configured) SL resource pools. For example, when any resource pool is indicated in a received 1$^{st}$ SCI transmission, a UE may determine to monitor for a PSCCH in the indicated resource pool(s). The indication may be implicit and/or may be an explicit index of the indicated resource pool(s). In another example, the indication may an explicit index of a SL BWP and/or a SL carrier.

A UE may proceed with decoding an associated 2$^{nd}$ stage SCI and/or associated PSSCH upon a condition that a SL resource pool, a SL BWP and/or a SL carrier indicated in the received 1$^{st}$ stage SCI transmission. A UE may determine not to monitor for and/or decode the associated 2$^{nd}$ stage SCI format and to discontinue the respective SCI decoding attempt upon a condition that the UE is not configured (e.g., pre-configured) with a SL resource pool, a SL BWP and/or a SL carrier indicated in the received 1$^{st}$ stage SCI transmission. As explained elsewhere, the UE may also proceed to a next SCI decoding attempt.

Continuing a SCI Decoding Attempt Based on Inter-UE Assistance Indication in a 1$^{st}$ Stage SCI Transmission In certain representative embodiments, a UE may indicate in a 1$^{st}$ stage SCI that an associated PSSCH may carry data for inter-UE assistance (e.g., a resource set provided by the UE to another UE for resource selection purposes). A 1-bit SCI field may be used for the inter-UE assistance indication. A UE may receive such inter-UE assistance after sending a request. Also, a UE may receive inter-UE assistance based on at least one configured (e.g., pre-configured) triggered condition (e.g., BLER and/or HARQ feedback conditions of SL transmissions by the UE).

A UE may determine to decode a 2$^{nd}$ stage SCI format and/or associated PSSCH when inter-UE assistance is indicated in the received 1$^{st}$ stage SCI transmission and is applicable to the UE. A UE may determine not to monitor for and/or decode a 2$^{nd}$ stage SCI format and to discontinue a respective SCI decoding attempt when inter-UE assistance is indicated in the received 1$^{st}$ stage SCI transmission but is not applicable to the UE. For example, a UE may determine the corresponding inter-UE assistance data is not intended for itself and proceed to a next SCI decoding attempt as explained elsewhere.

Continuing a SCI Decoding Attempt Based on a SL Activity and/or Power State Indication in a 1$^{st}$ Stage SCI Transmission In certain representative embodiments, a UE may include an indication of a SL activity state and/or power state of itself in a 1$^{st}$ stage SCI transmission. For example, an announcement of the UE entering a SL state of sleep, inactive and/or IDLE mode may be indicated. Also, an announce of the UE entering a SL state of awake, active and/or CONNECTED mode may be indicated.

A UE may determine to decode an associated 2$^{nd}$ stage SCI format and/or an associated PSSCH upon a condition that a SL state of sleep, inactive and/or IDLE mode is not indicated in a received 1$^{st}$ stage SCI transmission. A UE may determine not to monitor for and/or decode a 2$^{nd}$ stage SCI format and to discontinue the respective SCI decoding attempt upon a condition that the SL state of sleep, inactive and/or IDLE mode is indicated in the received 1$^{st}$ stage SCI transmission. As explained elsewhere, the UE may also proceed to a next SCI decoding attempt.

Continuing a SCI Decoding Attempt Based on an Unsupported Data Configuration Indicated in a 1$^{st}$ Stage SCI Transmission In certain representative embodiments, a UE may be configured (e.g., pre-configured) with a set of any of V2X data group(s), V2X service(s) and/or V2X application(s) supported for SL operation. Any of the supported data type/groups, services and/or applications may be associated with one or more configurations including any of (1) priority; (2) a DMRS pattern; (3) a 2$^{nd}$ stage SCI format; (4) a number of DMRS port(s); and/or (5) a MCS table.

A UE may determine not to monitor for and/or decode a 2$^{nd}$ stage SCI format and/or associated PSSCH and to discontinue the respective SCI decoding attempt upon a condition that the UE is not configured (e.g., pre-configured) to support one or more configurations indicated in a received 1$^{st}$ stage SCI transmission. For example, based on the configured (e.g., pre-configured) set of V2X data groups, V2X services and/or V2X applications, a UE may support data transmissions within a range of priority. A UE may receive SL data having a priority (e.g., L1 priority) that may be within the supported range. Thus, a UE may determine not to monitor for and/or decode an associated 2$^{nd}$ stage SCI format and/or an associated PSSCH and to discontinue the respective SCI decoding attempt when the UE is not configured (e.g., pre-configured) to support the priority in a received 1$^{st}$ stage SCI transmission. Similarly, a UE may support a set and/or range of 2$^{nd}$ stage SCI formats, MCS tables and/or DMRS pattern/port configurations. When a configuration indicated in a received 1$^{st}$ SCI transmission is not within the supported set and/or range, the UE may determine not to monitor for and/or decode an associated 2$^{nd}$ stage SCI format and to discontinue the respective SCI decoding attempt. As explained elsewhere, the UE may also proceed to a next SCI decoding attempt.

Continuing a SCI Decoding Attempt Based on an Indication for 1-Stage SCI Transmission in a 1$^{st}$ Stage SCI Transmission In certain representative embodiments, a UE may be configured (e.g., pre-configured) to support 1-stage SCI transmission. The 1-stage SCI transmission may be configured (e.g., pre-configured) specific to any of a V2X UE group, a V2X data group, a resource pool and/or a candidate $1^{st}$ stage SCI format. With 1-stage SCI transmission, a UE may receive an associated PSSCH using the decoded $1^{st}$ stage SCI information and no $2^{nd}$ stage SCI decoding is required. For example, a V2X data group to which 1-stage SCI transmission may be applied may include a broadcast emergency message intended for all V2X UEs and/or a group of V2X UEs. In another example, V2X data traffic generated by or intended for a VRU UE, such as VRU status information including any of speed, location, acceleration and/or trajectory information may use 1-stage SCI transmission. As another example, 1-stage SCI transmission may be configured (e.g., pre-configured) for discovery message transmission per resource pool.

In certain representative embodiments, an explicit 1-bit field indication may be included in a candidate $1^{st}$ stage SCI format. A UE may determine not to monitor for and/or decode an associated $2^{nd}$ stage SCI format and may discontinue the respective SCI decoding attempt. A UE may determine to proceed to decode an associated PSSCH when 1-stage SCI transmission is indicated in the decoded $1^{st}$ stage SCI format.

In certain representative embodiments, 1-stage SCI transmission may also be indicated implicitly in a $1^{st}$ stage SCI transmission based on any of (1) a candidate $1^{st}$ stage SCI format dedicated for 1-stage SCI transmission; (2) a resource pool SCI bit field to indicate a resource pool configured (e.g., pre-configured) for 1-stage SCI transmission; (3) a UE group bit field to indicate a UE group (e.g., a VRU group) configured (e.g., pre-configured) for 1-stage SCI transmission; (4) a UE data group bit field to indicate a UE data group (e.g. emergency and/or discovery messages) configured (e.g., pre-configured) for 1-stage SCI transmission; and/or (5) a $2^{nd}$ stage format bit field to indicate 1-stage only transmission such as a defined (e.g., predefined) code point.

Upon a successful decoding of a $1^{st}$ stage SCI, a UE may continue to decode the associated PSSCH when 1-stage SCI transmission is indicated explicitly and/or implicitly as described above. Upon such condition, no $2^{nd}$ stage SCI is required for the UE to perform decoding of the associated PSSCH.

In certain representative embodiments, a WTRU may implement a method of configuring the WTRU for device-to-device (D2D) communication. The method may include determining, by the WTRU, one or more resource pools based on any of a type of the D2D communication, a higher layer configuration, a hybrid automatic repeat request (HARQ) requirement of the D2D communication, a WTRU activity state, a WTRU power state, a quality of service (QoS) of the D2D communication, a D2D service, D2D control information, and/or a physical location of the WTRU. The method may further include monitoring, by the WTRU, the determined one or more resource pools for a physical sidelink (SL) control channel (PSCCH) transmission of D2D control information.

In certain representative embodiments, the method may further include determining, by the WTRU, one or more formats of the D2D control information. The monitoring of the determined resource pools may include monitoring for the PSCCH transmission having one of the determined formats of the D2D control information. For example, at least one of the formats may be determined according to the QoS of the D2D communication.

In certain representative embodiments, the method may further include determining, by the WTRU, one or more slots associated with the determined resource pools, one or more sub-channels associated with the determined resource pools, and/or one or more resource elements associated with the determined resource pools. The monitoring of the determined resource pools may include monitoring of any of the determined slots, the determined sub-channels and/or the determined resource elements for the PSCCH transmission of the D2D control information. For example, at least a portion of the one or more slots may be determined to have a period associated with the WTRU activity state, the WTRU power state and/or the physical location of the WTRU. For example, at least one of the sub-channels may be determined according to the WTRU activity state, the WTRU power state and/or the physical location of the WTRU. For example, at least one of the resource elements may be determined according to a number of symbols within at least one of the determined slots and/or a number of physical resource blocks (PRBs) within at least one of the determined sub-channels.

In certain representative embodiments, a WTRU may implement a method of configuring the WTRU for device-to-device (D2D) communication. The method may include monitoring, by the WTRU, one or more resource pools for a physical sidelink (SL) control channel (PSCCH) transmission of first D2D control information associated with a first decoding attempt. The method may further include decoding, by the WTRU during a first decoding attempt, the first D2D control information. The method may further include determining, by the WTRU, whether to terminate the first decoding attempt based on the decoded D2D control information. After determining to terminate the first decoding attempt, the method may include terminating, by the WTRU, the first decoding attempt prior to completing the first decoding attempt.

In certain representative embodiments, the decoded first D2D control information may include information regarding a format of second D2D control information associated with the first decoding attempt.

In certain representative embodiments, the method may further include monitoring, by the WTRU, the one or more resource pools for a physical sidelink (SL) shared channel (PSCCH) transmission of second D2D control information associated with the first decoding attempt. After determining to terminate the first decoding attempt, the method may include terminating, by the WTRU, the first decoding attempt prior to completing decoding of the second D2D control information.

In certain representative embodiments, after determining not to terminate the first decoding attempt, the method may include monitoring, by the WTRU, the one or more resource pools for a PSCCH transmission of the second D2D control information associated with the first decoding attempt and decoding, by the WTRU, the second D2D control information to complete the first decoding attempt.

In certain representative embodiments, the method may further include monitoring, by the WTRU, for a physical SL shared channel (PSSCH) transmission associated with the first decoding attempt and decoding, by the WTRU, the PSSCH transmission. For example, whether to terminate the first decoding attempt may be based on a 1-bit field indication of the decoded first D2D control information. For example, whether to terminate the first decoding attempt may be based on a multi-bit field indication of the decoded first D2D control information. For example, whether to terminate the first decoding attempt may be based on an indication of the decoded first D2D control information of a D2D group to which the WTRU belongs. For example, whether to terminate the first decoding attempt may be based on an indication of the decoded first D2D control information of whether the D2D communication is a unicast, groupcast or broadcast communication. For example, whether to terminate the first decoding attempt may be based on a configuration of the WTRU and an indication of a physical layer configuration of the decoded first D2D control information. For example, whether to terminate the first decoding attempt may be based on an indication of an activity state and/or power state of the decoded first D2D control information.

In certain representative embodiments, the method may further include performing, by the WTRU, a second decoding attempt after terminating the first decoding attempt. The first decoding attempt may be associated with a priority which is higher the second decoding attempt. For example, the priority may be based on any of a QoS requirement, a prior resource reservation, a metric of the determined resource pools, a D2D group which includes the WTRU, and/or a processing capability of the WTRU. The first decoding attempt and the second decoding attempt may be in a same time interval.

Figure 5:
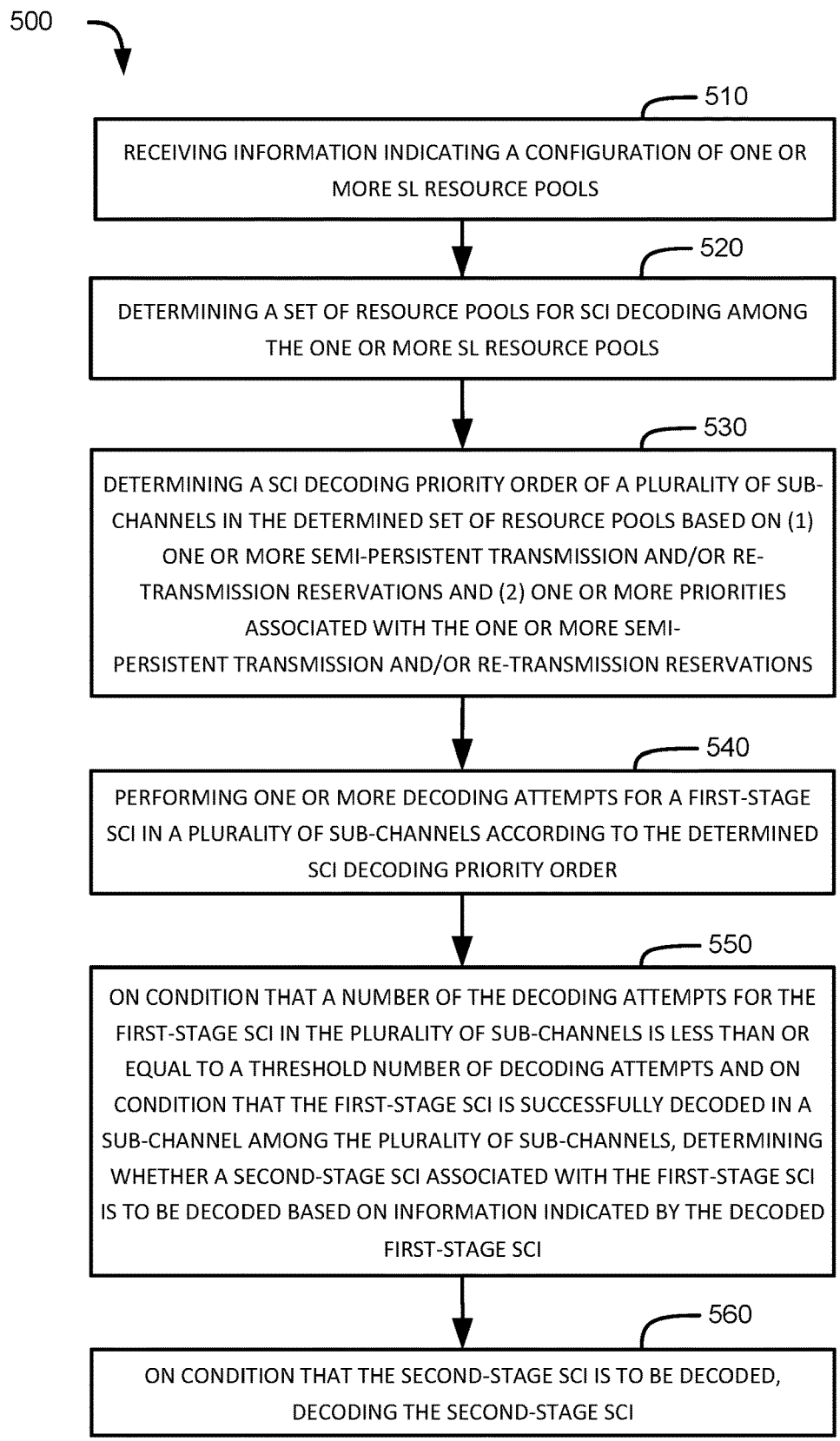
FIG. 5 is a diagram illustrating a representative two-stage SCI decoding procedure.

FIG. 5 is a diagram illustrating a representative two-stage SCI decoding procedure 500. A WTRU 102 may implement the procedure 500 shown in FIG. 5. As shown in FIG. 5, the procedure 500 may include the WTRU 102 receiving information indicating a configuration of one or more SL resource pools at 510. For example, the configuration may include information indicating any of a set of PSCCH monitoring resource pools, a set of candidate $1^{st}$ stage SCI formats to monitor in the PSCCH monitoring resource pools, a set of PSCCH monitoring slots in the PSCCH monitoring resource pools, a set of PSCCH monitoring sub-channels in the PSCCH monitoring resource pools, and/or a set of PSCCH monitoring REs. The WTRU 102 may proceed to determining a set of resource pools for SCI decoding among the one or more SL resource pools at 520 (e.g., which are configured at 510). The set of resource pools may be determined, for example, in any manner as described herein. After 520, the WTRU 102 may proceed to determining a SCI decoding priority order of a plurality of sub-channels in the determined set of resource pools based on (1) one or more semi-persistent transmission and/or re-transmission reservations and (2) one or more priorities associated with the one or more semi-persistent transmission and/or re-transmission reservations at 530. For example, semi-persistent transmission reservations may be ordered in the SCI decoding priority order based on respective priorities associated therewith. For example, re-transmission reservations may be ordered based on based on respective priorities associated therewith. As another example, any semi-persistent transmission reservations may be prioritized over any re-transmission reservations, or vice versa.

After 530, the WTRU may proceed to performing one or more decoding attempts for a first-stage SCI in a plurality of sub-channels according to the determined SCI decoding priority order at 540. For example, the one or more decoding attempts may be performed with respect to the plurality of sub-channels for a same slot as described herein (e.g., one decoding attempt using each sub-channel for the slot). At 550, on condition that a number of the decoding attempts for the first-stage SCI in the plurality of sub-channels is less than or equal to a threshold number of decoding attempts and on condition that the first-stage SCI is successfully decoded in a sub-channel among the plurality of sub-channels, the WTRU may determine whether a second-stage SCI associated with the first-stage SCI is to be decoded based on information indicated by the decoded first-stage SCI. After 550, the WTRU 102 may proceed, on condition that the second-stage SCI is to be decoded, to decoding the second-stage SCI at 560.

For example, after decoding the second-stage SCI, the WTRU 102 may proceed to decode a data transmission (e.g., PSSCH transmission) associated with the decoded second-stage SCI.

In certain representative embodiments, a PSCCH transmission may be received in one of the sub-channels and the PSCCH transmission may include the first-stage SCI.

In certain representative embodiments, a configuration of the one or more SL resource pools may include a number of symbols and/or PRBs for the PSCCH transmission.

In certain representative embodiments, information indicated by the decoded first-stage SCI may include information indicating resources used to receive a physical sidelink shared channel (PSSCH) transmission associated with the first-stage SCI. For example, the PSSCH transmission may include the second-stage SCI and/or a data transmission associated therewith.

In certain representative embodiments, the second-stage SCI may be received in a same slot as the first-stage SCI which is successfully decoded in one of the sub-channels at 540.

In certain representative embodiments, the determination of the set of resource pools for SCI decoding among the one or more SL resource pools may be based on any of a traffic type, a WTRU group type, a power state, a zone identifier, and/or a SL quality of service (QoS).

In certain representative embodiments, the determination of the set of resource pools for SCI decoding among the one or more SL resource pools may be based on any of a channel type associated with the first-stage SCI and/or second-stage SCI, a signal type associated with the first-stage SCI and/or second-stage SCI, at least one WTRU capability of the WTRU, and/or a resource grant associated with the SCI decoding from a base station.

In certain representative embodiments, the determination of the SCI decoding priority order of the plurality of sub-channels in the determined set of resource pools may be based on (1) the one or more semi-persistent transmission and/or re-transmission reservations, (2) the one or more priorities associated with the one or more semi-persistent transmission and/or re-transmission reservations, and any of (3) one or more quality of services (QoSs) associated with the plurality of sub-channels, (4) one or more channel busy ratios (CBRs) associated with the plurality of sub-channels, and/or (5) one or more SL groups associated with the plurality of sub-channels.

In certain representative embodiments, the determination of the SCI decoding priority order of the plurality of sub-channels in the determined set of resource pools may be based on (1) the one or more semi-persistent transmission and/or re-transmission reservations, (2) the one or more priorities associated with the one or more semi-persistent transmission and/or re-transmission reservations, and (3) at least one WTRU capability of the WTRU.

In certain representative embodiments, the determination of whether the second-stage SCI associated with the first-stage SCI is to be decoded is based on the information indicated by the decoded first-stage SCI which may include any of a WTRU group identifier, a SL group identifier, a destination identifier, a groupcast member identifier, an inter-WTRU assistance indication, a transport block priority, a resource configuration, a modulation and coding scheme (MCS) configuration, and/or a reference signal pattern configuration associated with the second-stage SCI.

In certain representative embodiments, the determination of whether the second-stage SCI associated with the first-stage SCI is to be decoded is based on the information indicated by the decoded first-stage SCI which may include a format of the second-stage SCI.

In certain representative embodiments, the threshold number of decoding attempts is associated with (e.g., determined according to) at least one WTRU capability of the WTRU.

Figure 6:
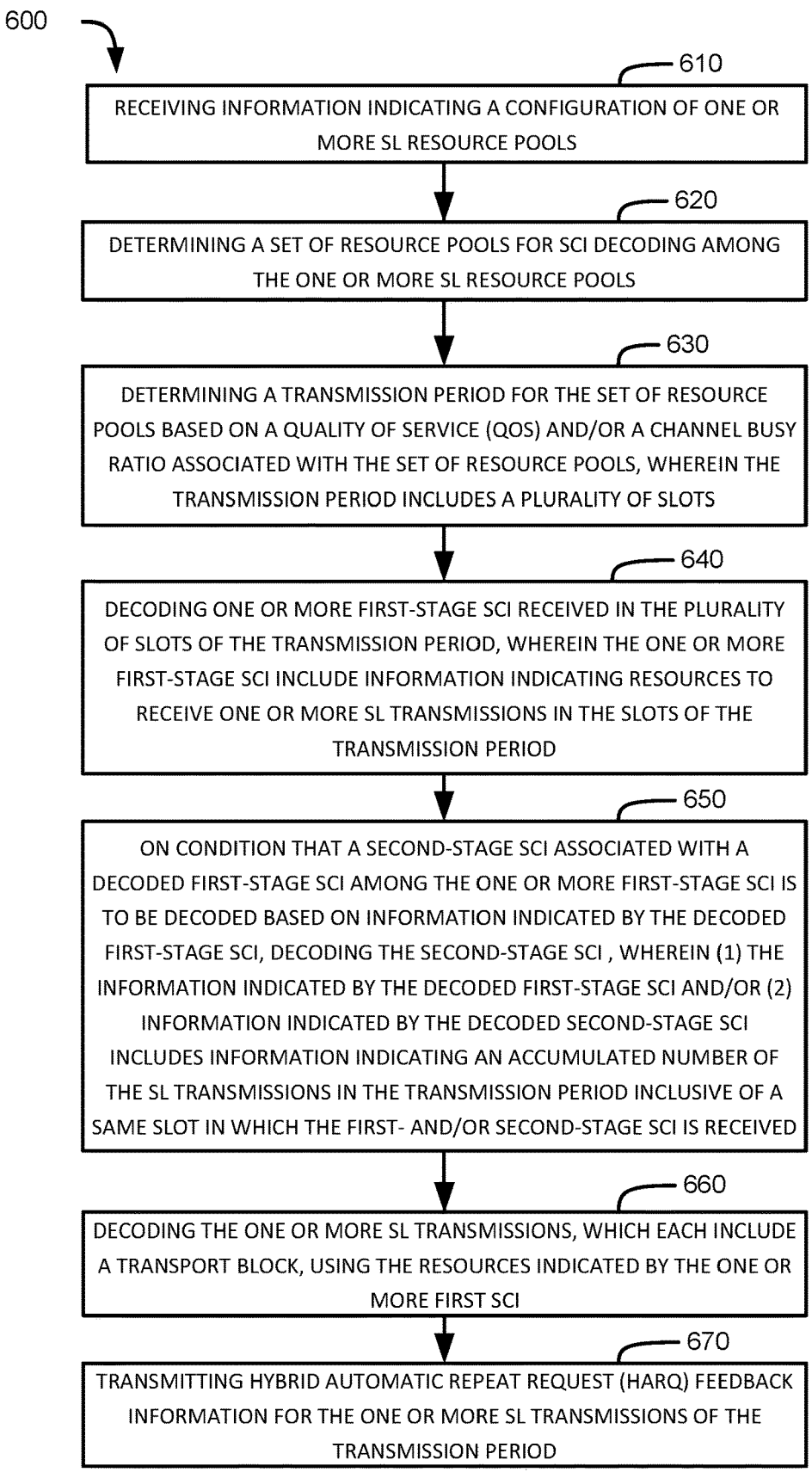
FIG. 6 is a diagram illustrating a representative two-stage SCI decoding procedure with HARQ feedback for a transmission period having a plurality of slots.

FIG. 6 is a diagram illustrating a representative two-stage SCI decoding procedure 600 with HARQ feedback for a transmission period having a plurality of slots. A WTRU 102 may implement the procedure 600 shown in FIG. 6. As shown in FIG. 6, the procedure 600 may include the WTRU 102 receiving information indicating a configuration of one or more SL resource pools at 610. For example, the configuration may include information indicating any of a set of PSCCH monitoring resource pools, a set of candidate $1^{st}$ stage SCI formats to monitor in the PSCCH monitoring resource pools, a set of PSCCH monitoring slots in the PSCCH monitoring resource pools, a set of PSCCH monitoring sub-channels in the PSCCH monitoring resource pools, and/or a set of PSCCH monitoring REs. The WTRU 102 may proceed to determining a set of resource pools a set of resource pools for SCI decoding among the one or more SL resource pools at 620. At 630, the WTRU 102 may proceed to determining a transmission period for the set of resource pools (e.g., based on a quality of service (QoS) and/or a channel busy ratio associated with the set of resource pools) at 620. The transmission period includes a plurality of slots (e.g., for SCI reception and SL data reception). For example, the slots may be consecutive within the transmission period. After 630, the WTRU 102 may proceed with decoding one or more first-stage SCI received in the plurality of slots of the transmission period at 640. The one or more first-stage SCI may include information indicating resources to receive one or more SL transmissions in the slots of the transmission period. For example, a first-stage SCI may include information indicating resources to receive a SL data transmission in a same slot in which the respective first-stage SCI is received.

At 650, the WTRU 102, on condition that a second-stage SCI associated with a decoded first-stage SCI among the one or more first-stage SCI is to be decoded based on information indicated by the decoded first-stage SCI, may proceed with decoding the second-stage SCI. For example, the second-stage SCI may be received in a same slot in which an associated SL data transmission and first-stage SCI are received. At 650, (1) the information indicated by the decoded first-stage SCI and/or (2) information indicated by the decoded second-stage SCI may include information indicating an accumulated number of the SL transmissions in the transmission period inclusive of a same slot in which the first- and/or second-stage SCI is received. For example, the first- and/or second-stage SCI may include a SL transmission index (e.g., representative of a number of SL transmissions performed thus far in the transmission period). After 650, the WTRU 102 may proceed to decoding the one or more SL transmissions at 660, which each include a transport block (TB), using the resources indicated by the one or more first-stage SCI. For example, each first-stage SCI may include information indicating time and/or frequency resources to used to receive and/or decode a respective SL transmission.

After 660, the WTRU may proceed with transmitting HARQ feedback information for the one or more SL transmissions of the transmission period. The HARQ information may be transmitted according to any of the embodiments described herein. For example, the HARQ information (e.g., ACK and/or NACK bits) may be transmitted using a set of PSFCH resources. For example, HARQ ACK/NACK information of any (e.g., all) received TBs may be transmitted in a joint manner after an end of the transmission period. The ACK/NACK information may be in the form of a bitmap corresponding to the slots of the transmission period. The ACK/NACK information may be bundled, such as where ACK/NACK information for the transmission period is combined using an AND operation. The ACK/NACK information for the transmission period may be multiplexed in one PSFCH transmission (e.g., ACK/NACK bits may represent a number of actual SL transmissions which occur in the transmission period).

Figure 7:
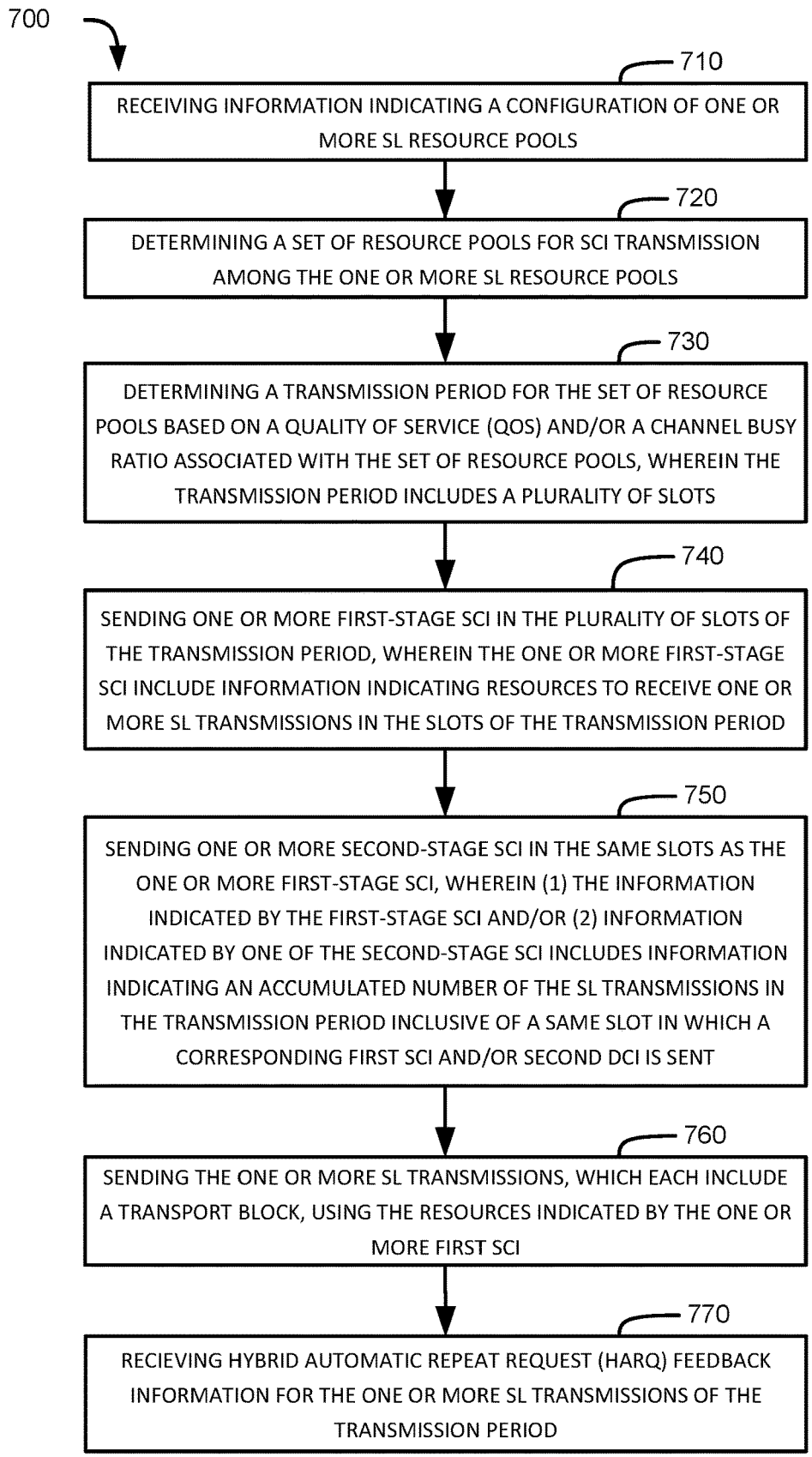
FIG. 7 is a diagram illustrating a representative two-stage SCI transmission procedure with HARQ feedback for a transmission period having a plurality of slots.

FIG. 7 is a diagram illustrating a representative two-stage SCI transmission procedure 700 with HARQ feedback for a transmission period having a plurality of slots. A WTRU 102 may implement the procedure 700 shown in FIG. 7. As shown in FIG. 7, the procedure 700 may include the WTRU 102 receiving information indicating a configuration of one or more SL resource pools at 710. For example, the configuration may include information indicating any of a set of PSCCH monitoring resource pools, a set of candidate $1^{st}$ stage SCI formats to monitor in the PSCCH monitoring resource pools, a set of PSCCH monitoring slots in the PSCCH monitoring resource pools, a set of PSCCH monitoring sub-channels in the PSCCH monitoring resource pools, and/or a set of PSCCH monitoring REs. The WTRU 102 may proceed to determining a set of resource pools a set of resource pools for SCI transmission among the one or more SL resource pools at 720. At 730, the WTRU 102 may proceed to determining a transmission period for the set of resource pools (e.g., based on a quality of service (QoS) and/or a channel busy ratio associated with the set of resource pools). The transmission period includes a plurality of slots (e.g., for SCI reception and SL data reception). For example, the slots may be consecutive within the transmission period. After 730, the WTRU 102 may proceed with sending one or more first-stage SCI in the plurality of slots of the transmission period at 740. The one or more first-stage SCI may include information indicating resources for receiving one or more SL transmissions in the slots of the transmission period. For example, a first-stage SCI may include information indicating resources to receive a SL data transmission in a same slot in which the respective first-stage SCI is received.

At 750, the WTRU 102 may send one or more second-stage SCI (e.g., in the same slots of the transmission period as the one or more first-stage SCI). For example, the second-stage SCI may be sent in a same slot in which an associated SL data transmission and first-stage SCI are sent. At 750, (1) the information indicated by the first-stage SCI and/or (2) the information indicated by the second-stage SCI may include information indicating an accumulated number of the SL transmissions in the transmission period inclusive of a same slot in which the first- and/or second-stage SCI are sent. For example, the first- and/or second-stage SCI may include a SL transmission index (e.g., representative of a number of SL transmissions sent thus far in the transmission period). At 760, the WTRU 102 may send the one or more SL transmissions, which each include a transport block (TB), using the resources indicated by the one or more first-stage SCI. For example, each first-stage SCI may include information indicating time and/or frequency resources used to receive and/or decode a respective SL transmission.

After 760, the WTRU may proceed with receiving HARQ feedback information for the one or more SL transmissions of the transmission period. The HARQ information may be transmitted according to any of the embodiments described herein. For example, the HARQ information (e.g., ACK and/or NACK bits) may be transmitted using a set of PSFCH resources. For example, HARQ ACK/NACK information of any (e.g., all) received TBs may be transmitted in a joint manner after an end of the transmission period. The ACK/NACK information may be in the form of a bitmap corresponding to the slots of the transmission period. The ACK/NACK information may be bundled, such as where ACK/NACK information for the transmission period is combined using an AND operation. The ACK/NACK information for the transmission period may be multiplexed in one PSFCH transmission (e.g., ACK/NACK bits may represent a number of actual SL transmissions which occur in the transmission period).

FIG. 8 is a diagram illustrating another representative two-stage SCI transmission procedure 800 with HARQ feedback for a transmission period having a plurality of slots. A WTRU 102 may implement the procedure 800 shown in FIG. 8. As shown in FIG. 8, the procedure 800 may include the WTRU 102 decoding a plurality of first-stage SCI using a SL resource pool at 810. The SL resource pool may be configured as described herein. The first-stage SCI may be respectively received in a plurality of slots of a transmission period. The first-stage SCI may include information indicating resources to receive one or more SL transmissions in the slots of the transmission period. The decoding of the first-stage SCI may use prioritized sub-channels as described herein. The WTRU 102 may decode a plurality of second-stage SCI received in the plurality of slots of the transmission period at 820. information indicated by a respective first- and/or second-stage SCI may include information indicating an accumulated number of the SL transmissions in the transmission period inclusive of a same slot in which the respective first- and/or second-stage SCI is received. The WTRU 102 may decode a plurality of SL transmissions, which each include a transport block at 830. The SL transmissions may occur in the plurality of slots of the transmission period in which the second-stage SCI are present. At 840, the WTRU 102 may transmit HARQ Feedback information for the plurality of SL transmissions of the transmission period based on the accumulated number of SL transmissions indicated by the first- and/or second-stage SCI. For example, the HARQ feedback may be performed as described herein.

In certain representative embodiments, a WTRU may implement a method of configuring the WTRU for device-to-device (D2D) communication. The method may include determining, by the WTRU, one or more resource pools based on any of a type of the D2D communication, a higher layer configuration, a hybrid automatic repeat request (HARQ) requirement of the D2D communication, a WTRU activity state, a WTRU power state, a quality of service (QoS) of the D2D communication, a D2D service, D2D control information, and/or a physical location of the WTRU, and monitoring, by the WTRU, for a physical sidelink (SL) control channel (PSCCH) transmission of D2D control information using the determined one or more resource pools.

For example, the WTRU may determine one or more formats of the D2D control information. The WTRU may monitor the determined resource pools includes monitoring for the PSCCH transmission having one of the determined formats of the D2D control information. At least one of the formats may be determined according to the QoS of the D2D communication.

For example, the WTRU may determine one or more slots associated with the determined resource pools, one or more sub-channels associated with the determined resource pools, and/or one or more resource elements associated with the determined resource pools. The WTRU may monitor the determined resource pools which may include monitoring of any of the determined slots, the determined sub-channels and/or the determined resource elements for the PSCCH transmission of the D2D control information. At least a portion of the one or more slots may be determined to have a period associated with the WTRU activity state, the WTRU power state and/or the physical location of the WTRU. At least one of the sub-channels may be determined according to the WTRU activity state, the WTRU power state and/or the physical location of the WTRU. At least one of the resource elements may be determined according to a number of symbols within at least one of the determined slots and/or a number of physical resource blocks (PRBs) within at least one of the determined sub-channels.

In certain representative embodiments, a WTRU may implement a method of configuring the WTRU for device-to-device (D2D) communication. The method may include monitoring, by the WTRU, for a physical sidelink (SL) control channel (PSCCH) transmission of first D2D control information associated with a first decoding attempt using one or more resource pools, decoding, by the WTRU during a first decoding attempt, the first D2D control information, determining, by the WTRU, whether to terminate the first decoding attempt based on the decoded D2D control information, and, after determining to terminate the first decoding attempt, terminating, by the WTRU, the first decoding attempt prior to completing the first decoding attempt.

For example, the decoded first D2D control information may include information regarding a format of second D2D control information associated with the first decoding attempt.

For example, the WTRU may monitor for a physical sidelink (SL) shared channel (PSCCH) transmission of second D2D control information associated with the first decoding attempt using the one or more resource pools. After determining to terminate the first decoding attempt, the WTRU may terminate the first decoding attempt prior to completing decoding of the second D2D control information.

For example, the WTRU may, after determining not to terminate the first decoding attempt, monitor for a PSCCH transmission of the second D2D control information associated with the first decoding attempt using the one or more resource pools and decode the second D2D control information to complete the first decoding attempt.

For example, the WTRU may monitor a physical SL shared channel (PSSCH) transmission associated with the first decoding attempt and decode the PSSCH transmission (e.g., using the first D2D control information).

For example, whether to terminate the first decoding attempt may be based on a 1-bit field or multi-bit field indication of the decoded first D2D control information.

For example, whether to terminate the first decoding attempt may be based on an indication of the decoded first D2D control information of a D2D group to which the WTRU belongs.

For example, whether to terminate the first decoding attempt may be based on an indication of the decoded first D2D control information of whether the D2D communication is a unicast, groupcast or broadcast communication.

For example, whether to terminate the first decoding attempt may be based on a configuration of the WTRU and an indication of a physical layer configuration of the decoded first D2D control information.

For example, whether to terminate the first decoding attempt may be based on an indication of an activity state and/or power state of (e.g., indicated by) the decoded first D2D control information.

For example, the WTRU may perform a second decoding attempt after terminating the first decoding attempt (e.g., in a same time interval, such as a same slot using a different sub-channel than the first decoding attempt). The first decoding attempt may be associated with a higher priority than the second decoding attempt. Prioritization of the first and second decoding attempts may be based on any of a QoS requirement, a prior resource reservation, a metric of the determined resource pools, a D2D group which includes the WTRU, and/or a processing capability of the WTRU.

For example, whether to terminate the first decoding attempt may be based on a SL channel mode of any of the PSCCH, a physical sidelink feedback channel (PSFCH) or a physical sidelink shared channel (PSSCH).

For example, whether to terminate the first decoding attempt may be based on a discovery indication in the decoded first D2D control information.

For example, whether to terminate the first decoding attempt may be based on a WTRU capability.

For example, whether to terminate the first decoding attempt may be based on any of a channel sensing mode for a physical sidelink shared channel (PSSCH) and/or a transmission mode indicated in the decoded first D2D control information.

In certain representative embodiments, a WTRU may implement a method of configuring the WTRU for device-to-device (D2D) communication. The method may include determining, by the WTRU, one or more resource pools for a physical sidelink (SL) control channel (PSCCH) transmission based on any of a SL channel mode, a SL signal, a WTRU capability, a SL transmission mode of the WTRU, monitoring, by the WTRU, for the PSCCH transmission using the determined one or more resource pools, decoding, by the WTRU during a decoding attempt, the PSCCH transmission to generate first D2D control information associated with the decoding attempt, and determining, a format of second D2D control information based on the generated first D2D control information.

For example, the SL channel mode may be associated with any of the PSCCH, a physical sidelink feedback channel (PSFCH) or a physical sidelink shared channel (PSSCH).

For example, the SL signal may include a resource selection indication, or the SL signal may be any of a discovery signal, a synchronization signal, or a broadcast signal.

For example, the WTRU capability may be any of a transmission-only capability, a reception-only capability, a communication bandwidth capability, and/or a hardware configuration of the WTRU.

For example, the SL transmission mode may be Mode 1 or Mode 2.

For example, the WTRU may monitor for a PSCCH transmission of second D2D control information associated with the first decoding attempt, decode, during the first decoding attempt, the second D2D control information, and determine a transmission period, having a plurality of slots, for a physical sidelink shared channel (PSSCH) transmission.

For example, the WTRU may determine the transmission period for the PSSCH based on an indication in any of the first D2D control information or the second D2D control information. The indication may be a number of the slots of the transmission period.

For example, the WTRU may transmit a PSSCH transport block (TB) in at least one of the slots. For example, the WTRU may transmit a same PSSCH transport block (TB) in two or more of the slots. For example, the WTRU may transmit one or more different PSSCH transport blocks (TBs) in two or more of the slots.

For example, the WTRU may receive a PSSCH transmission of a transport block (TB) in at least one of the slots. For example, the WTRU may receive multiple PSSCH transmissions of a same transport block (TB) in two or more of the slots. For example, the WTRU may receive PSSCH transmissions of one or more different transport blocks (TBs) in two or more of the slots.

For example, the WTRU may transmit multiplexed HARQ ACK/NACK indications in a physical sidelink feedback channel (PSFCH) based on each of received PSSCH transmissions in the transmission period. For example, the WTRU may transmit bundled HARQ ACK/NACK indications in a physical sidelink feedback channel (PSFCH) based on all of the received PSSCH transmissions in the transmission period. For example, the WTRU may transmit individual HARQ ACK/NACK indications in a physical sidelink feedback channel (PSFCH) based on the respectively received PSSCH transmissions in the transmission period.

In certain representative embodiments, a WTRU may include a processor, a transceiver and a storage unit, and may be configured to execute any of the methods and/or procedures described herein.

In certain representative embodiments, a vehicle may include a processor, a transceiver and a storage unit, and may be configured to execute any of the methods and/or procedures described herein.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art, No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats.

However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "Including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed is:

1. A method implemented by a WTRU for sidelink (SL) control information (SCI) decoding, the method comprising:
   receiving information indicating a configuration of one or more SL resource pools;
   determining a set of resource pools for SCI decoding among the one or more SL resource pools;
   determining a SCI decoding priority order of a plurality of sub-channels in the determined set of resource pools based on (1) one or more semi-persistent transmission and/or re-transmission reservations and (2) one or more priorities associated with the one or more semi-persistent transmission and/or re-transmission reservations;
   performing one or more decoding attempts for a first-stage SCI in the plurality of sub-channels according to the determined SCI decoding priority order;
   on condition that a number of the decoding attempts for the first-stage SCI in the plurality of sub-channels is less than or equal to a threshold number of decoding attempts, determining whether a second-stage SCI associated with the first-stage SCI is to be decoded based on information indicated by the first-stage SCI; and
   on condition that the second-stage SCI is to be decoded, decoding the second-stage SCI.

2. The method of claim 1, wherein the configuration of the one or more SL resource pools indicates any of the plurality of sub-channels, one or more slots, one or more formats for the first-stage SCI, and/or one or more resource elements associated with a physical SL control channel (PSCCH) transmission.

3. The method of claim 1, further comprising:
   receiving a physical SL control channel (PSCCH) transmission in a sub-channel among the plurality of sub-channels, wherein the PSCCH transmission includes the first-stage SCI.

4. The method of claim 1, wherein the information indicated by the decoded first-stage SCI includes information indicating resources used to receive a physical sidelink shared channel (PSSCH) transmission, and wherein the PSSCH transmission includes the second-stage SCI.

5. The method of claim 1, wherein the second-stage SCI is received in a same slot as the first-stage SCI which is successfully decoded in a sub-channel among the plurality of sub-channels.

6. The method of claim 1, wherein the determining of the set of resource pools for SCI decoding among the one or more SL resource pools is based on any of a traffic type, a WTRU group type, a power state, a zone identifier, and/or a SL quality of service (QoS).

7. The method of claim 1, wherein the determining of the set of resource pools for SCI decoding among the one or more SL resource pools is based on any of a channel type associated with the first-stage SCI and/or the second-stage SCI, a signal type associated with the first-stage SCI and/or the second-stage SCI, at least one WTRU capability of the WTRU, and/or a resource grant associated with the SL SCI decoding from a base station.

8. The method of claim 1, wherein the determining of the SCI decoding priority order of the plurality of sub-channels in the determined set of resource pools is further based on any of (3) one or more quality of services (QoSs) associated with the plurality of sub-channels, (4) one or more channel busy ratios (CBRs) associated with the plurality of sub-channels, and/or (5) one or more SL groups associated with the plurality of sub-channels.

9. The method of claim 1, wherein the determining whether the second-stage SCI associated with the first-stage SCI is to be decoded is based on information indicated by successfully decoding the first-stage SCI in a sub-channel among the plurality of sub-channels.

10. The method of claim 9, the information indicated by the successfully decoded first-stage SCI includes any of a WTRU group identifier, a SL group identifier, a destination identifier, a groupcast member identifier, an inter-WTRU assistance indication, a transport block priority, a resource configuration, a modulation and coding scheme (MCS) configuration, and/or a reference signal pattern configuration associated with the second-stage SCI.

11. A WTRU, the WTRU comprising:
   a processor and a transceiver which are configured to:
      receive information indicating a configuration of one or more sidelink (SL) resource pools;
      determine a set of resource pools for SL control information (SCI) decoding among the one or more SL resource pools;
      determine a SCI decoding priority order of a plurality of sub-channels in the determined set of resource pools based on (1) one or more semi-persistent transmission and/or re-transmission reservations and (2) one or more priorities associated with the one or more semi-persistent transmission and/or re-transmission reservations;

perform one or more decoding attempts for a first-stage SCI in the plurality of sub-channels according to the determined SCI decoding priority order;

on condition that a number of the decoding attempts for the first-stage SCI in the plurality of sub-channels is less than or equal to a threshold number of decoding attempts, determine whether a second-stage SCI associated with the first-stage SCI is to be decoded based on information indicated by the first-stage SCI; and on condition that the second-stage SCI is to be decoded, decode the second-stage SCI.

12. The WTRU of claim 11, wherein the configuration of the one or more SL resource pools indicates any of the plurality of sub-channels, one or more slots, one or more formats for the first-stage SCI, and/or one or more resource elements associated with a physical SL control channel (PSCCH) transmission.

13. The WTRU of claim 11, wherein the processor and the transceiver are configured to receive a physical SL control channel (PSCCH) transmission in a sub-channel among the plurality of sub-channels, wherein the PSCCH transmission includes the first-stage SCI.

14. The WTRU of claim 11, wherein the information indicated by the decoded first-stage SCI includes information indicating resources used to receive a physical sidelink shared channel (PSSCH) transmission, and wherein the PSSCH transmission includes the second-stage SCI.

15. The WTRU of claim 11, wherein the second-stage SCI is received in a same slot as the first-stage SCI which is successfully decoded in a sub-channel among the plurality of sub-channels.

16. The WTRU of claim 11, wherein the processor is configured to determine the set of resource pools for SCI decoding among the one or more SL resource pools is based on any of a traffic type, a WTRU group type, a power state, a zone identifier, and/or a SL quality of service (QoS).

17. The WTRU of claim 11, wherein the processor is configured to determine the set of resource pools for SCI decoding among the one or more SL resource pools is based on any of a channel type associated with the first-stage SCI and/or the second-stage SCI, a signal type associated with the first-stage SCI and/or the second-stage SCI, a WTRU capability of the WTRU, and/or a resource grant associated with the SL SCI decoding from a base station.

18. The WTRU of claim 11, wherein the processor is configured to determine the SCI decoding priority order of the plurality of sub-channels in the determined set of resource pools further based on any of (3) one or more quality of services (QoSs) associated with the plurality of sub-channels, (4) one or more channel busy ratios (CBRs) associated with the plurality of sub-channels, and/or (5) one or more SL groups associated with the plurality of sub-channels.

19. The WTRU of claim 11, wherein the processor is configured to determine whether the second-stage SCI associated with the first-stage SCI is to be decoded is based on information indicated by successfully decoding the first-stage SCI in a sub-channel among the plurality of sub-channels.

20. The WTRU of claim 19, wherein the information indicated by the successfully decoded first-stage SCI includes any of a WTRU group identifier, a SL group identifier, a destination identifier, a groupcast member identifier, an inter-WTRU assistance indication, a transport block priority, a resource configuration, a modulation and coding scheme (MCS) configuration, and/or a reference signal pattern configuration associated with the second-stage SCI.

* * * * *